(12) United States Patent
Liao et al.

(10) Patent No.: US 10,310,221 B2
(45) Date of Patent: *Jun. 4, 2019

(54) OPTICAL LENS ASSEMBLY, IMAGE CAPTURING APPARATUS AND ELECTRONIC DEVICE

(71) Applicant: LARGAN PRECISION CO., LTD., Taichung (TW)

(72) Inventors: Lin-Yao Liao, Taichung (TW); Hsin-Hsuan Huang, Taichung (TW); Shu-Yun Yang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/689,236

(22) Filed: Aug. 29, 2017

(65) Prior Publication Data

US 2018/0003924 A1 Jan. 4, 2018

Related U.S. Application Data

(63) Continuation of application No. 15/181,580, filed on Jun. 14, 2016, now Pat. No. 9,784,945.

(30) Foreign Application Priority Data

Apr. 6, 2016 (TW) .............................. 105110720 A

(51) Int. Cl.
*G02B 13/18* (2006.01)
*G02B 3/02* (2006.01)
(Continued)

(52) U.S. Cl.
CPC ............. *G02B 13/004* (2013.01); *G02B 9/34* (2013.01); *G02B 13/04* (2013.01); *G02B 27/0025* (2013.01)

(58) Field of Classification Search
CPC .... G02B 13/004; G02B 27/0025; G02B 9/34; G02B 13/04
See application file for complete search history.

(56) References Cited

U.S. PATENT DOCUMENTS 2,003,112 A 5/1935 French et al.
8,879,168 B1 11/2014 Hsu et al.
(Continued)

FOREIGN PATENT DOCUMENTS

CN 201955537 U 8/2011
JP 1996262322 10/1996
(Continued)

*Primary Examiner* — Alicia M Harrington
(74) *Attorney, Agent, or Firm* — Locke Lord LLP; Tim Tingkang Xia, Esq.

(57) ABSTRACT

This invention provides an optical lens assembly including, in order from an object side to an image side: a first lens element with negative refractive power having an image-side surface being concave in a paraxial region thereof; a second lens element having positive refractive power; a third lens element having an object-side surface being concave in a paraxial region thereof; and a fourth lens element having an object-side surface being convex in a paraxial region thereof and an image-side surface being concave in a paraxial region thereof, the image-side surface thereof having at least one convex shape in an off-axis region thereof; wherein the optical lens assembly has a total of four lens elements. With such configuration, the optical lens assembly is characterized by a reduced size and a wide field of view.

26 Claims, 24 Drawing Sheets

(51) Int. Cl.
*G02B 13/00* (2006.01)
*G02B 9/34* (2006.01)
*G02B 13/04* (2006.01)
*G02B 27/00* (2006.01)

(56) References Cited

U.S. PATENT DOCUMENTS

2015/0085382 A1* 3/2015 Choi .................. G02B 9/58
                                                    359/715
2017/0235098 A1    8/2017 Tsai et al.

FOREIGN PATENT DOCUMENTS

| | | |
|---|---|---|
| JP | 1997054259 | 2/1997 |
| JP | 1997061710 | 3/1997 |
| JP | 1997068648 | 3/1997 |
| JP | 1999133297 | 5/1999 |
| JP | 2004246166 | 9/2004 |
| TW | I588518 B | 6/2017 |
| WO | 2011111561 A1 | 9/2011 |

* cited by examiner

OPTICAL LENS ASSEMBLY, IMAGE CAPTURING APPARATUS AND ELECTRONIC DEVICE

RELATED APPLICATIONS

This application is a continuation application of U.S. application Ser. No. 15/181,580 filed on Jun. 14, 2016, now approved and claims priority to Taiwan Application Serial Number 105110720, filed on Apr. 6, 2016, which is incorporated by reference herein in its entirety.

BACKGROUND

Technical Field

The present disclosure relates to an optical lens assembly and an image capturing apparatus, and more particularly, to an optical lens assembly and an image capturing apparatus applicable to electronic devices.

Description of Related Art

With the miniaturization and diversification of electronic devices, the photographing module has a wide range of applications including various intelligent electronic devices, driving cameras, security surveillance cameras, 3D depth sensing devices (e.g. Time-of-Flight (TOF) cameras), and Human-Computer interaction (HCI) platforms. Accordingly, the demand for photographing modules with high-spec lens assemblies is increasing. Moreover, there is a trend in the market towards lens assemblies featuring a wide field of view and a compact size.

However, a conventional lens assembly with a wide field of view generally requires a large number of lens elements to receive light in order to capture an image of a larger area. As a result, the size of the product equipped with the conventional lens assembly with a wide field of view cannot be reduced easily. Accordingly, the conventional lens assembly with a wide field of view usually fails to concurrently meet the requirements of a wide field of view and a short total track length because of its configuration. Or, it is likely that the overwhelming stray light renders the image quality unsatisfactory, limiting the range of applications of the conventional lens assembly with a wide field of view. Therefore, the conventional design can no longer support the specification and fulfill the needs in the future.

SUMMARY

According to one aspect of the present disclosure, there is provided an optical lens assembly comprising, in order from an object side to an image side: a first lens element with negative refractive power having an image-side surface being concave in a paraxial region thereof; a second lens element having positive refractive power; a third lens element having an object-side surface being concave in a paraxial region thereof; and a fourth lens element having an object-side surface being convex in a paraxial region thereof and an image-side surface being concave in a paraxial region thereof, the image-side surface thereof having at least one convex shape in an off-axis region thereof; wherein the optical lens assembly has a total of four lens elements and every two adjacent lens elements among the first through fourth lens elements are not cemented; and wherein an axial distance between the first lens element and the second lens element is T12, an axial distance between the second lens element and the third lens element is T23, a central thickness of the second lens element is CT2, a focal length of the optical lens assembly is f, a focal length of the third lens element is f3, a focal length of the fourth lens element is f4, f/f3 is P3, f/f4 is P4, a curvature radius of the image-side surface of the fourth lens element is R8, and the following conditions are satisfied:

$0<T23/T12<1.5;$ $0.60<T12/CT2<1.85;$ $|P3|+|P4|<1.5;$ and $0<R8/f<4.0.$

According to another aspect of the present disclosure, there is provided an optical lens assembly comprising, in order from an object side to an image side: a first lens element with negative refractive power having an image-side surface being concave in a paraxial region thereof; a second lens element having positive refractive power; a third lens element having an object-side surface being concave in a paraxial region thereof; and a fourth lens element having an object-side surface being convex in a paraxial region thereof and an image-side surface being concave in a paraxial region thereof, the image-side surface thereof having at least one convex shape in an off-axis region thereof; wherein the optical lens assembly has a total of four lens elements; and wherein an axial distance between the first lens element and the second lens element is T12, an axial distance between the second lens element and the third lens element is T23, a central thickness of the second lens element is CT2, a sum of central thicknesses of the first lens element, the second lens element, the third lens element and the fourth lens element is ΣCT, and the following conditions are satisfied:

$0<T23/T12<1.5;$ $0.60<T12/CT2<1.85;$ and $1.0<\Sigma CT/CT2<3.7.$

According to still another aspect of the present disclosure, there is provided an optical lens assembly comprising, in order from an object side to an image side: a first lens element with negative refractive power having an image-side surface being concave in a paraxial region thereof; a second lens element having positive refractive power; a third lens element having an object-side surface being concave; and a fourth lens element having an object-side surface being convex in a paraxial region thereof and an image-side surface being concave in a paraxial region thereof, the image-side surface thereof having at least one convex shape in an off-axis region thereof; wherein the optical lens assembly has a total of four lens elements and further comprises an aperture stop disposed between the first lens element and the second lens element; and wherein an axial distance between the first lens element and the second lens element is T12, an axial distance between the second lens element and the third lens element is T23, a central thickness of the second lens element is CT2, a sum of central thicknesses of the first lens element, the second lens element, the third lens element, and the fourth lens element is ΣCT, an axial distance between the aperture stop and an image surface is SL, an axial distance between an object-side surface of the first lens element and the image surface is TL, and the following conditions are satisfied:

$0 < T23/T12 < 1.5$;

$1.0 < \Sigma CT/CT2 < 2.85$; and $SL/TL < 0.78$.

According to yet another aspect of the present disclosure, there is provided an image capturing apparatus comprising the aforementioned optical lens assembly and an image sensor.

According to a further aspect of the present disclosure, there is provided an electronic device comprising the aforementioned image capturing apparatus.

The first lens element with negative refractive power, which is favorable for forming a retro-focus structure, enables light to enter the optical lens assembly at a larger incident angle. The second lens element has positive refractive power so that the optical lens assembly has a sufficient convergent capability to prevent the total track length of the optical lens assembly from being too long, thereby the optical lens assembly features a compact size and a wide field of view. Moreover, the configuration that the third lens element has an object-side surface being concave in a paraxial region thereof is favorable for correcting the astigmatism; the configuration that the fourth lens element has an object-side surface being convex in a paraxial region thereof and an image-side surface being concave in a paraxial region thereof can effectively correct the field curvature so that an image of the imaged object can be smoothly formed on the image sensor; the configuration that the image-side surface of the fourth lens element has at least one convex shape in an off-axis region thereof is favorable for correcting the off-axis aberration while concurrently reducing the angle at which light is incident to the image surface of the optical lens assembly from the off-axis field.

When the aforesaid condition of T23/T12 is satisfied, the spatial arrangement of the optical lens assembly can be effectively balanced so as to facilitate the assembling of the lens elements. When the aforesaid condition of T12/CT2 is satisfied, the thickness of the second lens element and the distance between the second lens element and the first lens element can be controlled to prevent the interference between the first lens element and the second lens element, and it is favorable for the assembling of the lens elements. When the aforesaid condition of |P3|+|P4| is satisfied, the distribution of the refractive power at the rear end of the optical lens assembly can be effectively controlled so as to enhance the optical lens assembly's capability to correct the off-axis aberration. When the aforesaid condition of R8/f is satisfied, the back focal length of the optical lens assembly can be effectively controlled to prevent the total track length of the optical lens assembly from being too long. When the aforesaid condition of ΣCT/CT2 is satisfied, an optimal configuration is available for assembling the lens elements of the optical lens assembly, thereby increasing the yield rate of the manufacture of the optical lens assembly. When the aforesaid condition of SL/TL is satisfied, the position of the aperture stop can be adjusted to enlarge the field of view of the optical lens assembly so that the optical lens assembly is favorably characterized by a wide field of view.

DETAILED DESCRIPTION

Figure 1A:
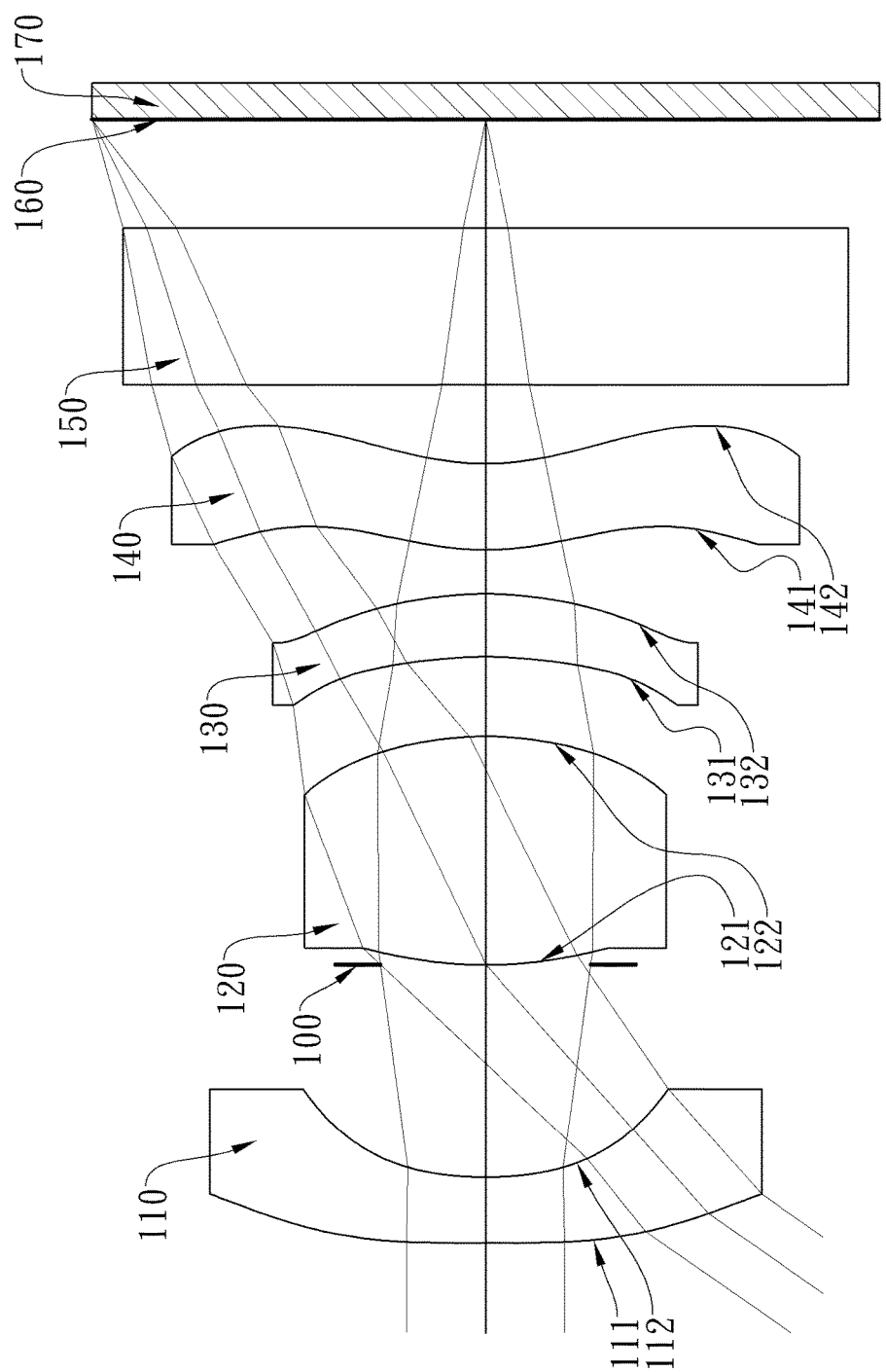
FIG. 1A is a schematic view of an image capturing apparatus according to the 1st embodiment of the present disclosure.

The present disclosure provides an optical lens assembly comprising, in order from an object side to an image side, a first lens element, a second lens element, a third lens element and a fourth lens element.

The first lens element with negative refractive power, which is favorable for forming a retro-focus structure, enables light to enter the optical lens assembly at a larger incident angle. The first lens element has an image-side surface being concave in a paraxial region thereof so as to assist the off-axis light with a larger incident angle to enter the optical lens assembly, and thereby enlarging the photographing range.

The second lens element has positive refractive power so that the optical lens assembly has a sufficient convergent capability and the spatial arrangement thereof can be effectively controlled, thereby preventing the total track length of the optical lens assembly from being too long.

The third lens element has an object-side surface being concave in a paraxial region thereof so as to favorably correct the astigmatism.

The fourth lens element has an object-side surface being convex in a paraxial region thereof and an image-side surface being concave in a paraxial region thereof so that the field curvature of the optical lens assembly can be effectively corrected, thereby an image of the imaged object can be smoothly formed on the image sensor. Moreover, the image-side surface of the fourth lens element has at least one convex shape in an off-axis region thereof, so that it is favorable for correcting the off-axis aberration while concurrently reducing the angle at which light is incident to the image surface of the optical lens assembly from the off-axis field.

When an axial distance between the first lens element and the second lens element is T12, an axial distance between the second lens element and the third lens element is T23, and the following condition is satisfied: $0<T23/T12<1.5$, the spatial arrangement of the optical lens assembly can be effectively balanced so as to facilitate the assembling of the lens elements. Preferably, the following condition is satisfied: $0<T23/T12<1.0$.

When the axial distance between the first lens element and the second lens element is T12, a central thickness of the second lens element is CT2, and the following condition is satisfied: $0.6<T12/CT2<1.85$, the thickness of the second lens element and the distance between the second lens element and the first lens element can be controlled to prevent the interference between the first lens element and the second lens element, and it is favorable for the assembling of the lens elements.

When a focal length of the optical lens assembly is f, a focal length of the third lens element is f3, a focal length of the fourth lens element is f4, f/f3 is P3, f/f4 is P4, and the following condition is satisfied: $|P3|+|P4|<1.5$, the distribution of the refractive power at the rear end of the optical lens assembly can be controlled so as to enhance the optical lens assembly's capability to correct the off-axis aberration. Preferably, the following condition is satisfied: $|P3|+|P4|<0.90$.

When a curvature radius of the image-side surface of the fourth lens element is R8, the focal length of the optical lens assembly is f, and the following condition is satisfied: $0<R8/f<4.0$, the back focal length of the optical lens assembly can be effectively controlled to prevent the total track length of the optical lens assembly from being too long. Preferably, the following condition is satisfied: $0<R8/f<1.2$.

When a sum of central thicknesses of the first lens element, the second lens element, the third lens element and the fourth lens element is $\Sigma CT$, the central thickness of the second lens element is CT2, and the following condition is satisfied: $1.0<\Sigma CT/CT2<3.7$, an optimal configuration is available for assembling the lens elements of the optical lens assembly, thereby increasing the yield rate of manufacture of the optical lens assembly. Preferably, the following condition is satisfied: $1.0<\Sigma CT/CT2<2.85$.

When an axial distance between an aperture stop and an image surface is SL, an axial distance between an object-side surface of the first lens element and the image surface is TL, and the following condition is satisfied: $0<SL/TL<0.78$, the position of the aperture stop can be adjusted to enlarge the field of view of the optical lens assembly so that the optical lens assembly is favorably characterized by a wide field of view.

When the central thickness of the second lens element is CT2, a central thickness of the fourth lens element is CT4, and the following condition is satisfied: $1.5<CT2/CT4<7.0$, it is favorable for preventing the image quality from being affected by an unbalanced spatial arrangement of the optical lens assembly. Preferably, the following condition is satisfied: $1.85<CT2/CT4<5.5$.

When a maximum axial distance and a minimum axial distance among the axial distances between respective two adjacent lens elements of the optical lens assembly are ATmax and ATmin, respectively, a maximum central thickness and a minimum central thickness among the central thicknesses of the first lens element, the second lens element, the third lens element and the fourth lens element are CTmax and CTmin, respectively, and the following conditions are satisfied: $1.0<ATmax/ATmin<23.0$ and $2.4<CTmax/CTmin<5.0$, the thickness of each lens element and the variation in the distances between the lens elements can be effectively controlled, so that it is favorable for the assembling of the lens elements, thereby increasing the yield rate of manufacture of the optical lens assembly.

When the focal length of the optical lens assembly is f, the axial distance between the first lens element and the second lens element is T12, and the following condition is satisfied: $0<f/T12<2.0$, the distance between the first lens element and the second lens element is sufficient for the accommodation of other optical elements, and it is also favorable for the assembling of the lens elements.

An air gap is arranged between every two adjacent lens elements of the first lens element, the second lens element, the third lens element and the fourth lens element in the optical axis. That is, the first lens element, the second lens element, the third lens element and the fourth lens element are four separate non-cemented (non-adhered) lens elements. The manufacturing process of the cemented lens elements is more complex than that of the non-cemented lens elements. In particular, two cementing surfaces between two adjacent lenses of the lens assembly need to have accurate curvature to ensure that these two lens elements will be highly cemented. Moreover, during the cementing process, those two lens elements might have axial-shifted defect due to displacement and it is thereby not favorable for the image quality of the optical lens assembly. Therefore, the first through fourth lens elements of the optical lens assembly can be four separate non-cemented lens elements so as to effectively avoid the problems of the cemented lens elements.

When half of a maximum field of view of the optical lens assembly is HFOV, and the following condition is satisfied: $1.10<\tan(\text{HFOV})$, the field of view of the optical lens assembly can be effectively enlarged to extend the range of applications for which the optical lens assembly can be used. Preferably, the following condition is satisfied: $1.25<\tan(\text{HFOV})<13.0$.

When a curvature radius of an object-side surface of the second lens element is R3, a curvature radius of an image-side surface of the second lens element is R4, and the following condition is satisfied: $-0.3<(R3+R4)/(R3-R4)<2.0$, the curvatures of the surfaces of the second lens element can be adjusted so that the positive refractive power of the second lens element can be properly distributed, and it is favorable for reducing the aberration. Preferably, the following condition is satisfied: $0<(R3+R4)/(R3-R4)<0.88$.

When a focal length of the first lens element is f1, a focal length of the second lens element is f2, and the following condition is satisfied: $1.0<|f1/f2|<4.0$, the refractive power at the front end of the optical lens assembly can be adjusted, and it is favorable for maintaining a sufficient field of view while reducing the total track length of the optical lens assembly. Preferably, the following condition is satisfied: $1.6<|f1/f2|<3.5$. More preferably, the following condition is satisfied: $1.6<|f1/f2|<2.5$.

When the focal length of the optical lens assembly is f, the focal length of the first lens element is f1, the focal length of the second lens element is f2, the focal length of the third lens element is f3, the focal length of the fourth lens element is f4, f/f1 is P1, f/f2 is P2, f/f3 is P3, f/f4 is P4, and the following condition is satisfied: $(|P3|+|P4|)/(|P1|+|P2|)<0.50$, the refractive power required by the optical lens assembly can be mainly distributed by the first lens element and the second lens element so that the proportion of refractive power to be provided by the third lens element and the fourth lens element can be reduced, thereby the size of the optical lens assembly can be favorably reduced to extend the range of applications for which the optical lens assembly can be used. Preferably, the following condition is satisfied: $(|P3|+|P4|)/(|P1|+|P2|)<0.34$.

When the central thickness of the second lens element is CT2, a central thickness of the third lens element is CT3, the central thickness of the fourth lens element is CT4, and the following condition is satisfied: $0<(CT3+CT4)/CT2<0.95$, the thicknesses of the second lens element, the third lens element and the fourth lens element are proper and can be adjusted to achieve a better distribution of the refractive power.

When a wavelength of light incident to the optical lens assembly is $\lambda$, and the following condition is satisfied: $750\,\text{nm}<\lambda<950\,\text{nm}$, thermal radiation emitted by the human body can be captured so that the sensing operation will not be interfered with by a confusing background, and it can be used to calculate distances as well.

When a curvature radius of an object-side surface of the first lens element is R1, a curvature radius of the image-side surface of the first lens element is R2, and the following condition is satisfied: $1.0<(R1+R2)/(R1-R2)<3.0$, the shape of the first lens element can be effectively controlled to assist the light with a larger incident angle to enter the optical lens assembly.

According to the optical lens assembly of the present disclosure, the lens elements thereof can be made of glass or plastic material. When the lens elements are made of glass material, the distribution of the refractive power of the optical lens assembly is more flexible to design. When the lens elements are made of plastic material, the manufacturing cost can be effectively reduced. Furthermore, surfaces of each lens element can be arranged to be aspheric (ASP). Since these aspheric surfaces can be easily formed into shapes other than spherical shapes so as to have more controllable variables for eliminating aberrations and to further decrease the required number of lens elements, thus the total track length of the optical lens assembly can be effectively reduced.

According to the optical lens assembly of the present disclosure, the optical lens assembly can include at least one stop, such as an aperture stop, a glare stop or a field stop, so as to favorably reduce the amount of stray light and thereby to improve the image quality.

According to the optical lens assembly of the present disclosure, an aperture stop can be configured as a front stop or a middle stop. A front stop disposed between an imaged object and the first lens element can provide a longer distance between an exit pupil of the optical lens assembly and the image surface, so that the generated telecentric effect can improve the image-sensing efficiency of an image sensor, such as a CCD or CMOS sensor. A middle stop disposed between the first lens element and the image surface is favorable for enlarging the field of view of the optical lens assembly so that the optical lens assembly is characterized by a wide field of view.

According to the optical lens assembly of the present disclosure, when the lens element has a convex surface and the region of convex shape is not defined, it indicates that the surface can be convex in the paraxial region thereof. When the lens element has a concave surface and the region of concave shape is not defined, it indicates that the surface can be concave in the paraxial region thereof. Likewise, when the region of refractive power or focal length of a lens element is not defined, it indicates that the region of refractive power or focal length of the lens element can be in the paraxial region thereof.

According to the optical lens assembly of the present disclosure, the image surface of the optical lens assembly, based on the corresponding image sensor, can be a plane or a curved surface with any curvature, especially a curved surface being concave facing towards the object side.

The optical lens assembly of the present disclosure can be optionally applied to moving focus optical systems. According to the optical lens assembly of the present disclosure, the optical lens assembly features a good correction capability and high image quality, and can be applied to 3D (three-dimensional) image capturing applications and electronic devices, such as iris or face recognition devices, digital cameras, mobile devices, smart phones, digital tablets, smart TV, network surveillance devices, motion sensing input devices, driving recording systems, rear view camera systems, drone cameras and wearable devices.

The present disclosure further provides an image capturing apparatus comprising the aforementioned optical lens assembly and an image sensor, wherein the image sensor is disposed on or near an image surface of the optical lens assembly. Therefore, the design of the optical lens assembly enables the image capturing apparatus to achieve the best image quality. Preferably, the optical lens assembly can further comprise a barrel member, a holder member or a combination thereof.

Referring to FIG. 11A, FIG. 11B, FIG. 11C and FIG. 11D, an image capturing apparatus 1101 and a display system 1102 may be installed in an electronic device including, but not limited to, a rear view camera 1110, a driving recording system 1120, a surveillance camera 1130, or a smart phone 1140. The four exemplary figures of different electronic devices are only exemplary for showing the image capturing apparatus of the present disclosure installed in an electronic device, and the present disclosure is not limited thereto. Preferably, the electronic device can further comprise a control unit, a display unit, a storage unit, a random access memory unit (RAM) or a combination thereof.

According to the above description of the present disclosure, the following 1st-10th specific embodiments are provided for further explanation.

1st Embodiment

Figure 1B:
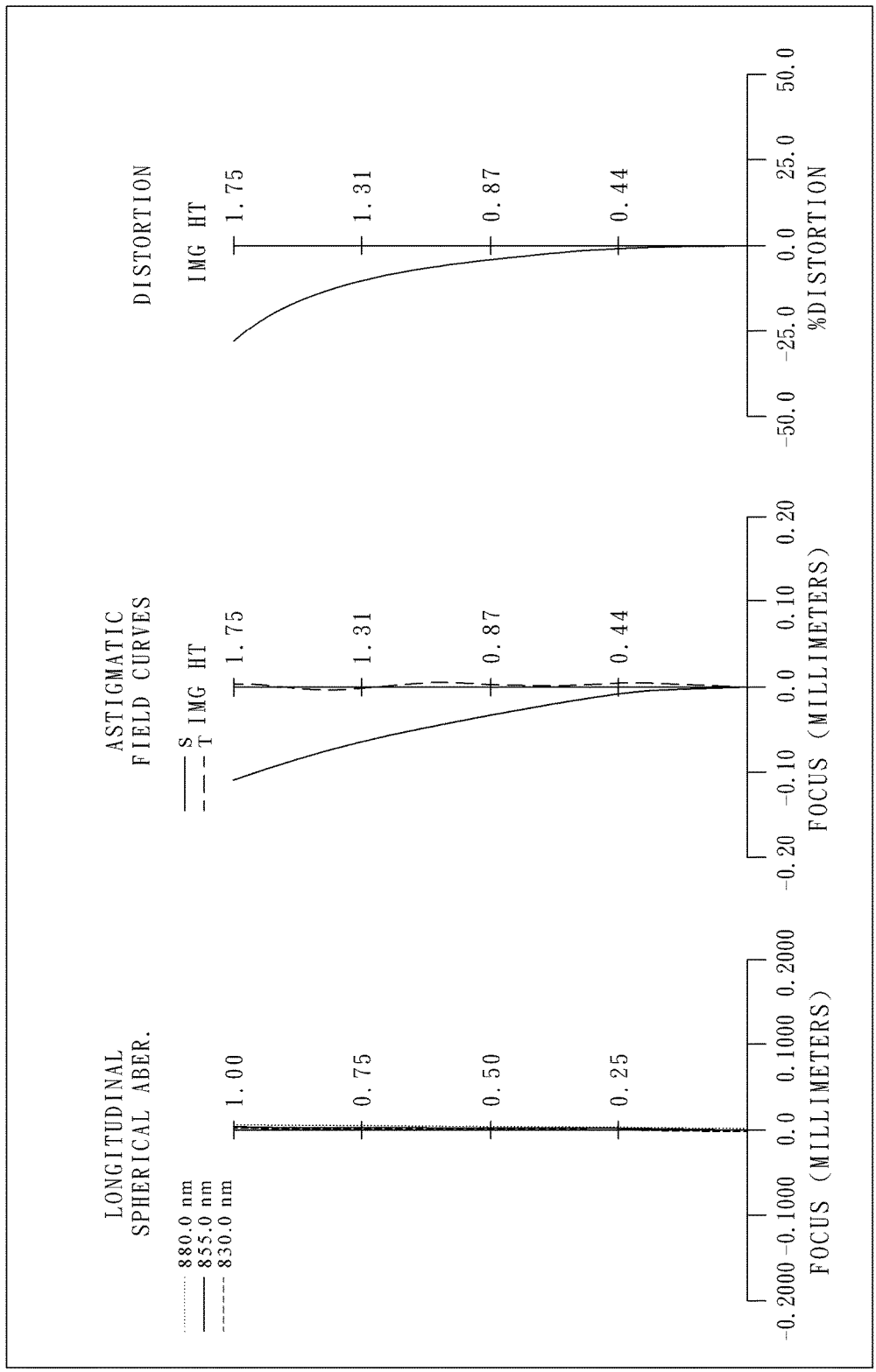
FIG. 1B shows longitudinal spherical aberration curves, astigmatic field curves and a distortion curve of the image capturing apparatus according to the 1st embodiment.

FIG. 1A is a schematic view of an image capturing apparatus according to the 1st embodiment of the present disclosure. FIG. 1B shows, in order from left to right, longitudinal spherical aberration curves, astigmatic field curves and a distortion curve of the image capturing apparatus according to the 1st embodiment.

In FIG. 1A, the image capturing apparatus comprises an optical lens assembly (not otherwise herein labeled) of the present disclosure and an image sensor 170. The optical lens assembly comprises, in order from an object side to an image side, a first lens element 110, an aperture stop 100, a second lens element 120, a third lens element 130, and a fourth lens element 140.

The first lens element 110 with negative refractive power has an object-side surface 111 being convex in a paraxial region thereof and an image-side surface 112 being concave in a paraxial region thereof, which are both aspheric, and the first lens element 110 is made of plastic material.

The second lens element 120 with positive refractive power has an object-side surface 121 being convex in a paraxial region thereof and an image-side surface 122 being convex in a paraxial region thereof, which are both aspheric, and the second lens element 120 is made of plastic material.

The third lens element 130 with positive refractive power has an object-side surface 131 being concave in a paraxial region thereof and an image-side surface 132 being convex in a paraxial region thereof, which are both aspheric, and the third lens element 130 is made of plastic material.

The fourth lens element 140 with positive refractive power has an object-side surface 141 being convex in a paraxial region thereof and an image-side surface 142 being concave in a paraxial region thereof, which are both aspheric, and the fourth lens element 140 is made of plastic material. Furthermore, the image-side surface 142 of the fourth lens element 140 has at least one convex shape in an off-axis region thereof.

The optical lens assembly further comprises a filter 150 located between the fourth lens element 140 and an image surface 160. The filter 150 is made of glass material and will not affect the focal length of the optical lens assembly. The image sensor 170 is disposed on or near the image surface 160 of the optical lens assembly.

The detailed optical data of the 1st embodiment are shown in TABLE 1, and the aspheric surface data are shown in TABLE 2, wherein the units of the curvature radius, the thickness and the focal length are expressed in mm, and HFOV is half of a maximum field of view.

TABLE 1

(1st Embodiment)
f = 1.72 mm, Fno = 2.45, HFOV = 55.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 44.189 | ASP | 0.292 | Plastic | 1.537 | 55.9 | −3.03 |
| 2 | | 1.567 | ASP | 0.947 | | | | |
| 3 | Ape. Stop | Plano | | −0.002 | | | | |
| 4 | Lens 2 | 1.882 | ASP | 1.017 | Plastic | 1.537 | 55.9 | 1.79 |
| 5 | | −1.585 | ASP | 0.354 | | | | |
| 6 | Lens 3 | −1.915 | ASP | 0.279 | Plastic | 1.527 | 55.7 | 19.60 |
| 7 | | −1.697 | ASP | 0.199 | | | | |
| 8 | Lens 4 | 1.308 | ASP | 0.382 | Plastic | 1.619 | 23.3 | 82.12 |
| 9 | | 1.193 | ASP | 0.350 | | | | |
| 10 | Filter | Plano | | 0.700 | Glass | 1.510 | 64.2 | — |
| 11 | | Plano | | 0.482 | | | | |
| 12 | Image Surface | Plano | | — | | | | |

Note:
Reference wavelength is 855.0 nm

TABLE 2

Aspheric Coefficients

| | Surface # | | | |
|---|---|---|---|---|
| | 1 | 2 | 4 | 5 |
| k = | 1.4719E+01 | −1.6404E+00 | −3.5473E+01 | 1.1243E+00 |
| A4 = | 2.7111E−01 | 4.6264E−01 | 6.0916E−01 | 8.1047E−02 |
| A6 = | −2.8480E−01 | −2.3377E−02 | −2.5901E+00 | −2.6262E−01 |
| A8 = | 2.4065E−01 | −4.5955E−01 | 8.6677E+00 | 2.8416E−01 |
| A10 = | −1.4643E−01 | 1.5346E+00 | −1.8850E+01 | −2.8017E−01 |
| A12 = | 4.9588E−02 | −1.6211E+00 | 1.6183E+01 | 1.7362E−02 |
| A14 = | −7.0754E−03 | 4.8411E−01 | 3.2340E+00 | 7.4138E−02 |

TABLE 2-continued

Aspheric Coefficients

| | Surface # | | | |
|---|---|---|---|---|
| | 6 | 7 | 8 | 9 |
| k = | −6.4575E−01 | −1.1913E+00 | −7.1413E−01 | −6.4166E−01 |
| A4 = | 4.3119E−01 | 1.5543E−01 | −4.3110E−01 | −3.7721E−01 |
| A6 = | −1.5086E+00 | −6.8252E−01 | 1.2671E−01 | 1.1708E−01 |
| A8 = | 2.8732E+00 | 1.5848E+00 | −6.9714E−02 | −3.3571E−03 |
| A10 = | −5.0596E+00 | −2.8378E+00 | 9.6156E−02 | −2.7787E−02 |
| A12 = | 5.3801E+00 | 2.9997E+00 | −5.1282E−02 | 1.2778E−02 |
| A14 = | −2.2292E+00 | −1.1349E+00 | 9.0196E−03 | −2.1047E−03 |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, a focal length of the optical lens assembly is f, an f-number of the optical lens assembly is Fno, half of a maximum field of view of the optical lens assembly is HFOV, and these parameters have the following values: f=1.72 mm; Fno=2.45; and HFOV=55.2 degrees.

In the 1st embodiment, half of the maximum field of view of the optical lens assembly is HFOV, and it satisfies the condition: tan(HFOV)=1.44.

In the 1st embodiment, the reference wavelength of the optical lens assembly is 855.0 nm.

In the 1st embodiment, an axial distance between the first lens element 110 and the second lens element 120 is T12, an axial distance between the second lens element 120 and the third lens element 130 is T23, and they satisfy the condition: T23/T12=0.37.

In the 1st embodiment, the axial distance between the first lens element 110 and the second lens element 120 is T12, a central thickness of the second lens element 120 is CT2, and they satisfy the condition: T12/CT2=0.93.

In the 1st embodiment, the central thickness of the second lens element 120 is CT2, a central thickness of the fourth lens element 140 is CT4, and they satisfy the condition: CT2/CT4=2.66.

In the 1st embodiment, the central thickness of the second lens element 120 is CT2, a central thickness of the third lens element 130 is CT3, the central thickness of the fourth lens element 140 is CT4, and they satisfy the condition: (CT3+CT4)/CT2=0.65.

In the 1st embodiment, a sum of central thicknesses of the first lens element 110, the second lens element 120, the third lens element 130 and the fourth lens element 140 is ΣCT, the central thickness of the second lens element 120 is CT2, and they satisfy the condition: ΣCT/CT2=1.94.

In the 1st embodiment, a maximum central thickness among the central thicknesses of the first lens element 110, the second lens element 120, the third lens element 130, and the fourth lens element 140 is CTmax, a minimum central thickness among the central thicknesses of the first lens element 110, the second lens element 120, the third lens element 130, and the fourth lens element 140 is CTmin, and they satisfy the condition: CTmax/CTmin=3.65.

In the 1st embodiment, a maximum axial distance among the axial distances between respective two adjacent lens elements of the optical lens assembly is ATmax, a minimum axial distance among the axial distances between respective two adjacent lens elements of the optical lens assembly is ATmin, and they satisfy the condition: ATmax/ATmin=4.75.

In the 1st embodiment, the focal length of the optical lens assembly is f, the axial distance between the first lens element 110 and the second lens element 120 is T12, and they satisfy the condition: f/T12=1.82.

In the 1st embodiment, the focal length of the optical lens assembly is f, a curvature radius of the image-side surface 142 of the fourth lens element 140 is R8, and they satisfy the condition: R8/f=0.69.

In the 1st embodiment, a curvature radius of the object-side surface 111 of the first lens element 110 is R1, a curvature radius of the image-side surface 112 of the first lens element 110 is R2, and they satisfy the condition: (R1+R2)/(R1−R2)=1.07.

In the 1st embodiment, a curvature radius of the object-side surface 121 of the second lens element 120 is R3, a curvature radius of the image-side surface 122 of the second lens element 120 is R4, and they satisfy the condition: (R3+R4)/(R3−R4)=0.09.

In the 1st embodiment, a focal length of the first lens element 110 is f1, a focal length of the second lens element 120 is f2, and they satisfy the condition: |f1/f2|=1.70.

In the 1st embodiment, the focal length of the optical lens assembly is f, a focal length of the third lens element 130 is f3, a focal length of the fourth lens element 140 is f4, f/f3 is P3, f/f4 is P4, and they satisfy the condition: |P3|+|P4|=0.11.

In the 1st embodiment, the focal length of the optical lens assembly is f, the focal length of the first lens element 110 is f1, the focal length of the second lens element 120 is f2, the focal length of the third lens element 130 is f3, the focal length of the fourth lens element 140 is f4, f/f1 is P1, f/f2 is P2, f/f3 is P3, f/f4 is P4, and they satisfy the condition: (|P3|+|P4|)/(|P1|+|P2|)=0.07.

In the 1st embodiment, an axial distance between the aperture stop 100 and the image surface 160 is SL, an axial distance between the object-side surface 111 of the first lens element 110 and the image surface 160 is TL, and they satisfy the condition: SL/TL=0.75.

2nd Embodiment

Figure 2A:
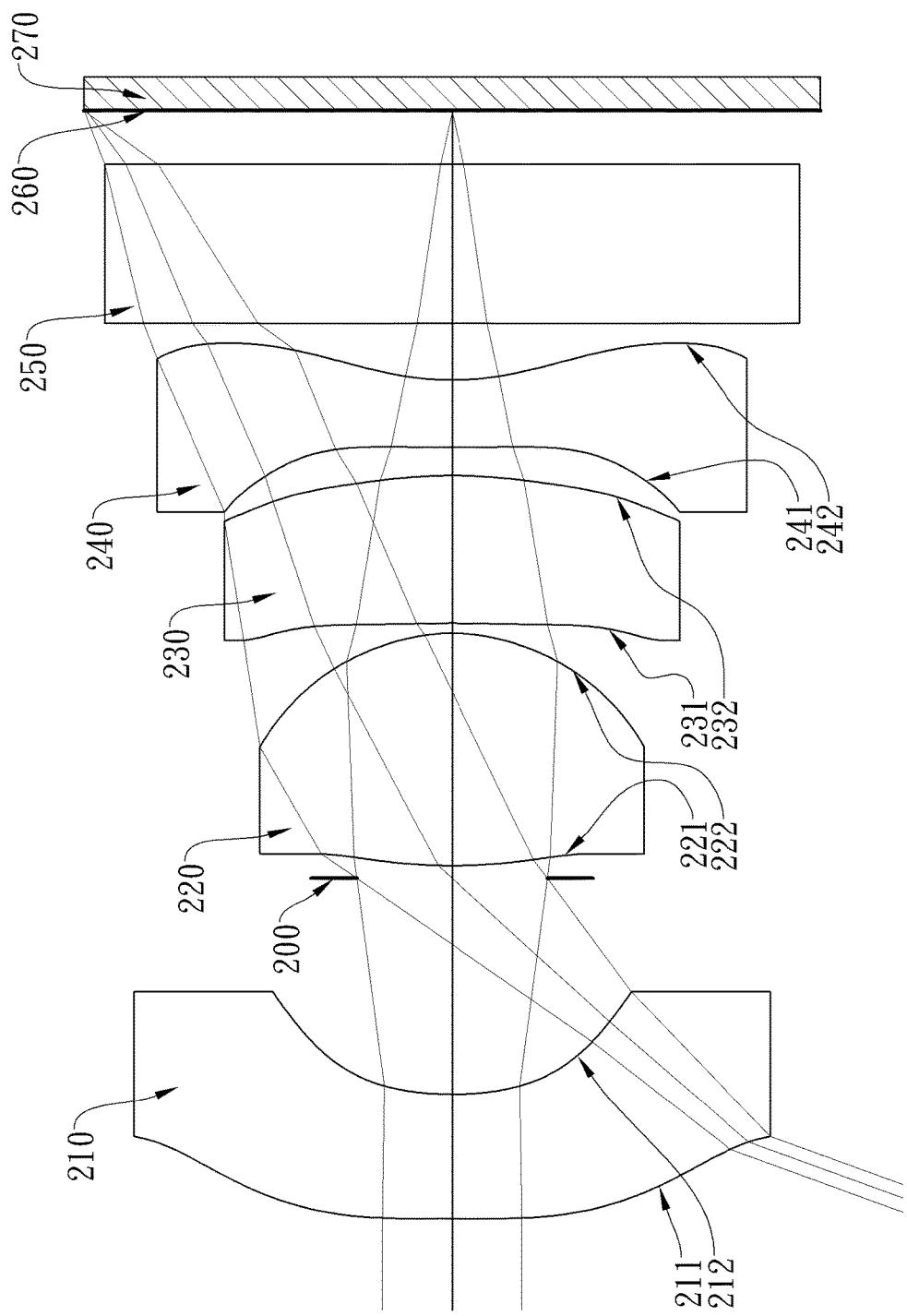
FIG. 2A is a schematic view of an image capturing apparatus according to the 2nd embodiment of the present disclosure.
Figure 2B:
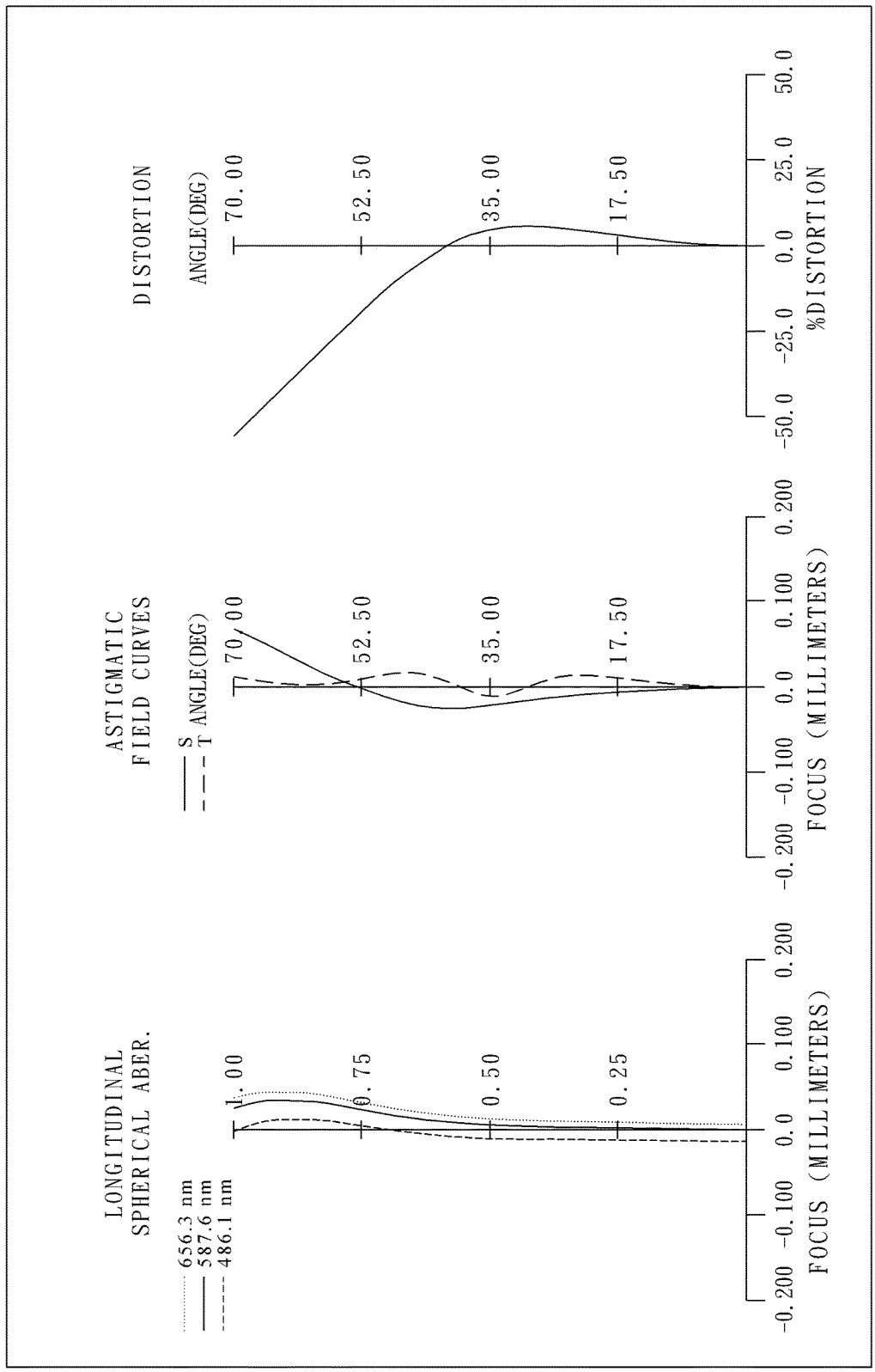
FIG. 2B shows longitudinal spherical aberration curves, astigmatic field curves and a distortion curve of the image capturing apparatus according to the 2nd embodiment.

FIG. 2A is a schematic view of an image capturing apparatus according to the 2nd embodiment of the present disclosure. FIG. 2B shows, in order from left to right, longitudinal spherical aberration curves, astigmatic field curves and a distortion curve of the image capturing apparatus according to the 2nd embodiment.

In FIG. 2A, the image capturing apparatus comprises an optical lens assembly (not otherwise herein labeled) of the present disclosure and an image sensor 270. The optical lens assembly comprises, in order from an object side to an image side, a first lens element 210, an aperture stop 200, a second lens element 220, a third lens element 230, and a fourth lens element 240.

The first lens element 210 with negative refractive power has an object-side surface 211 being convex in a paraxial region thereof and an image-side surface 212 being concave in a paraxial region thereof, which are both aspheric, and the first lens element 210 is made of plastic material.

The second lens element 220 with positive refractive power has an object-side surface 221 being convex in a paraxial region thereof and an image-side surface 222 being convex in a paraxial region thereof, which are both aspheric, and the second lens element 220 is made of plastic material.

The third lens element 230 with positive refractive power has an object-side surface 231 being concave in a paraxial region thereof and an image-side surface 232 being convex in a paraxial region thereof, which are both aspheric, and the third lens element 230 is made of plastic material.

The fourth lens element 240 with negative refractive power has an object-side surface 241 being convex in a paraxial region thereof and an image-side surface 242 being concave in a paraxial region thereof, which are both aspheric, and the fourth lens element 240 is made of plastic material. Furthermore, the image-side surface 242 of the fourth lens element 240 has at least one convex shape in an off-axis region thereof.

The optical lens assembly further comprises a filter 250 located between the fourth lens element 240 and an image surface 260. The filter 250 is made of glass material and will not affect the focal length of the optical lens assembly. The image sensor 270 is disposed on or near the image surface 260 of the optical lens assembly.

The detailed optical data of the 2nd embodiment are shown in TABLE 3, and the aspheric surface data are shown in TABLE 4, wherein the units of the curvature radius, the thickness and the focal length are expressed in mm, and HFOV is half of the maximum field of view.

TABLE 3

(2nd Embodiment)
f = 1.38 mm, Fno = 2.25, HFOV = 70.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 47.150 | ASP | 0.550 | Plastic | 1.544 | 55.9 | −2.86 |
| 2 | | 1.499 | ASP | 0.948 | | | | |
| 3 | Ape. Stop | Plano | | 0.055 | | | | |
| 4 | Lens 2 | 2.055 | ASP | 1.024 | Plastic | 1.544 | 55.9 | 1.25 |
| 5 | | −0.835 | ASP | 0.044 | | | | |
| 6 | Lens 3 | −5.672 | ASP | 0.651 | Plastic | 1.535 | 55.7 | 5.90 |
| 7 | | −2.110 | ASP | 0.123 | | | | |
| 8 | Lens 4 | 8.095 | ASP | 0.296 | Plastic | 1.640 | 23.3 | −2.25 |
| 9 | | 1.204 | ASP | 0.250 | | | | |
| 10 | Filter | Plano | | 0.700 | Glass | 1.517 | 64.2 | — |
| 11 | | Plano | | 0.237 | | | | |
| 12 | Image Surface | Plano | | — | | | | |

Note:
Reference wavelength is d-line 587.6 nm

TABLE 4

Aspheric Coefficients

| | Surface # | | | |
|---|---|---|---|---|
| | 1 | 2 | 4 | 5 |
| k = | −9.0000E+01 | 8.1237E−01 | −5.7134E+01 | −2.2646E−01 |
| A4 = | 3.7413E−01 | 6.6908E−01 | 5.3375E−01 | 4.3573E−01 |
| A6 = | −3.8745E−01 | 8.1893E−01 | −3.2356E+00 | −8.3562E−01 |
| A8 = | 3.4422E−01 | −6.6003E+00 | 1.0026E+01 | 7.4905E−01 |
| A10 = | −2.0624E−01 | 2.0280E+01 | −2.0000E+01 | −1.8309E−01 |
| A12 = | 6.1224E−02 | −3.0243E+01 | 1.6183E+01 | 1.7362E−02 |
| A14 = | −6.8685E−03 | 1.6752E+01 | 3.2340E+00 | 7.4138E−02 |

TABLE 4-continued

Aspheric Coefficients

| Surface # | | | | |
|---|---|---|---|---|
| | 6 | 7 | 8 | 9 |
| k = | 2.8255E+01 | 1.7871E+00 | −1.0000E+02 | −2.8089E−01 |
| A4 = | 5.0337E−01 | 3.4609E−01 | −2.9813E−01 | −3.3660E−01 |
| A6 = | −1.4952E+00 | −5.9431E−01 | −1.6253E−01 | −1.5686E−01 |
| A8 = | 2.65564E+00 | 1.2140E+00 | −8.9866E−02 | 3.7843E−01 |
| A10 = | −4.7845E+00 | −2.7372E+00 | 3.0785E−01 | −2.9888E−01 |
| A12 = | 5.3801E+00 | 2.9997E+00 | 2.0619E−01 | 1.0991E−01 |
| A14 = | −2.2292E+00 | −1.1349E+00 | −2.9431E−01 | −1.8209E−02 |

In the 2nd embodiment, the equation of the aspheric surface profiles of the aforementioned lens elements is the same as the equation of the 1st embodiment. Also, the definitions of these parameters shown in TABLE 5 below are the same as those stated in the 1st embodiment with corresponding values for the 2nd embodiment, so an explanation in this regard will not be provided again.

Moreover, these parameters can be calculated from TABLE 3 and TABLE 4 and satisfy the conditions stated in TABLE 5.

TABLE 5

2nd Embodiment

| | | | |
|---|---|---|---|
| f [mm] | 1.38 | CTmax/CTmin | 3.46 |
| Fno. | 2.25 | ATmax/ATmin | 22.80 |
| HFOV [deg.] | 70.0 | f/T12 | 1.38 |
| tan(HFOV) | 2.75 | R8/f | 0.87 |
| λ [nm] | 587.6 | (R1 + R2)/(R1 − R2) | 1.07 |
| T23/T12 | 0.04 | (R3 + R4)/(R3 − R4) | 0.42 |
| T12/CT2 | 0.98 | |f1/f2| | 2.29 |
| CT2/CT4 | 3.46 | |P3| + |P4| | 0.85 |
| (CT3 + CT4)/CT2 | 0.92 | (|P3| + |P4|)/(|P1| + |P2|) | 0.53 |
| ΣCT/CT2 | 2.46 | SL/TL | 0.69 |

3rd Embodiment

Figure 3A:
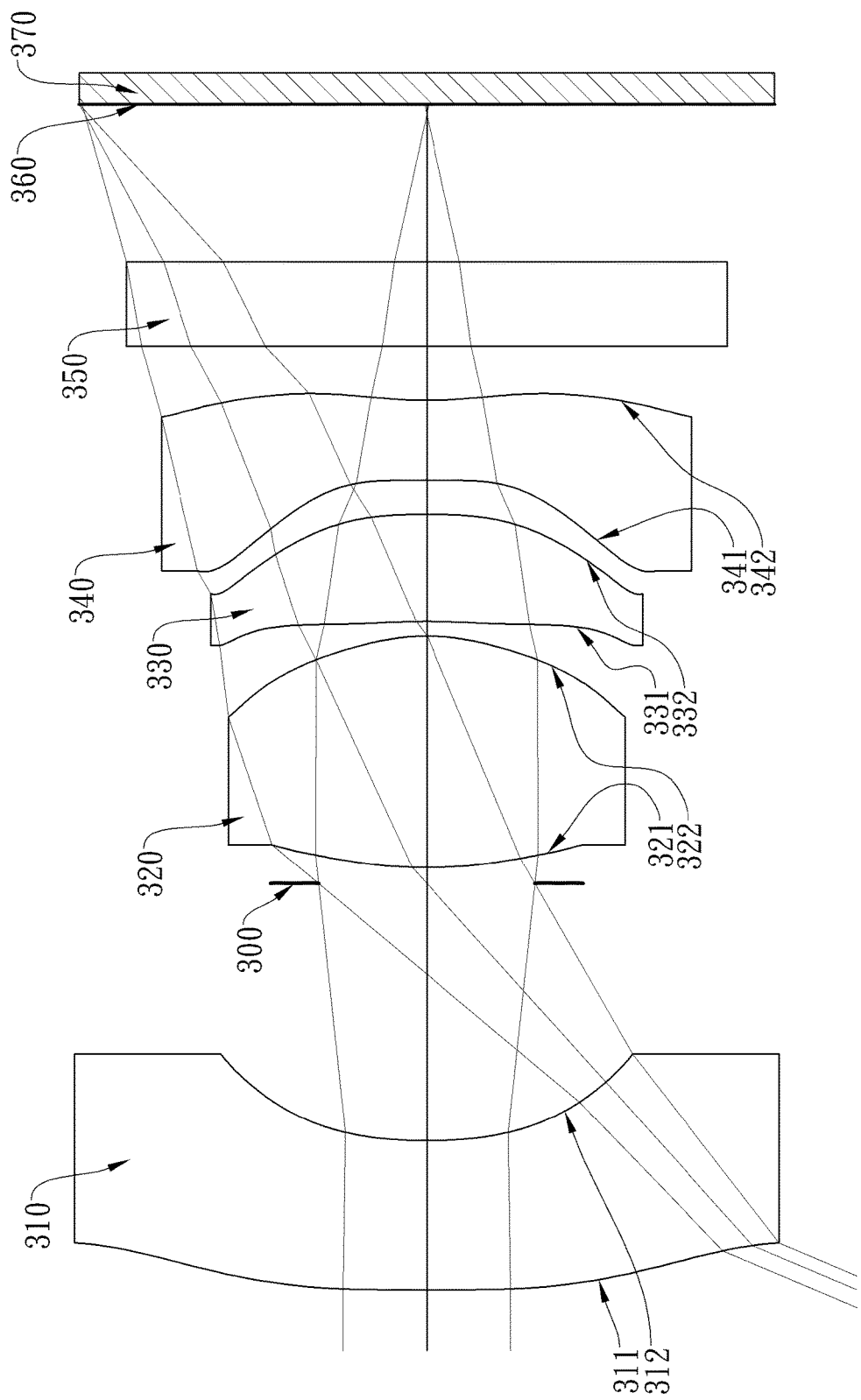
FIG. 3A is a schematic view of an image capturing apparatus according to the 3rd embodiment of the present disclosure.
Figure 3B:
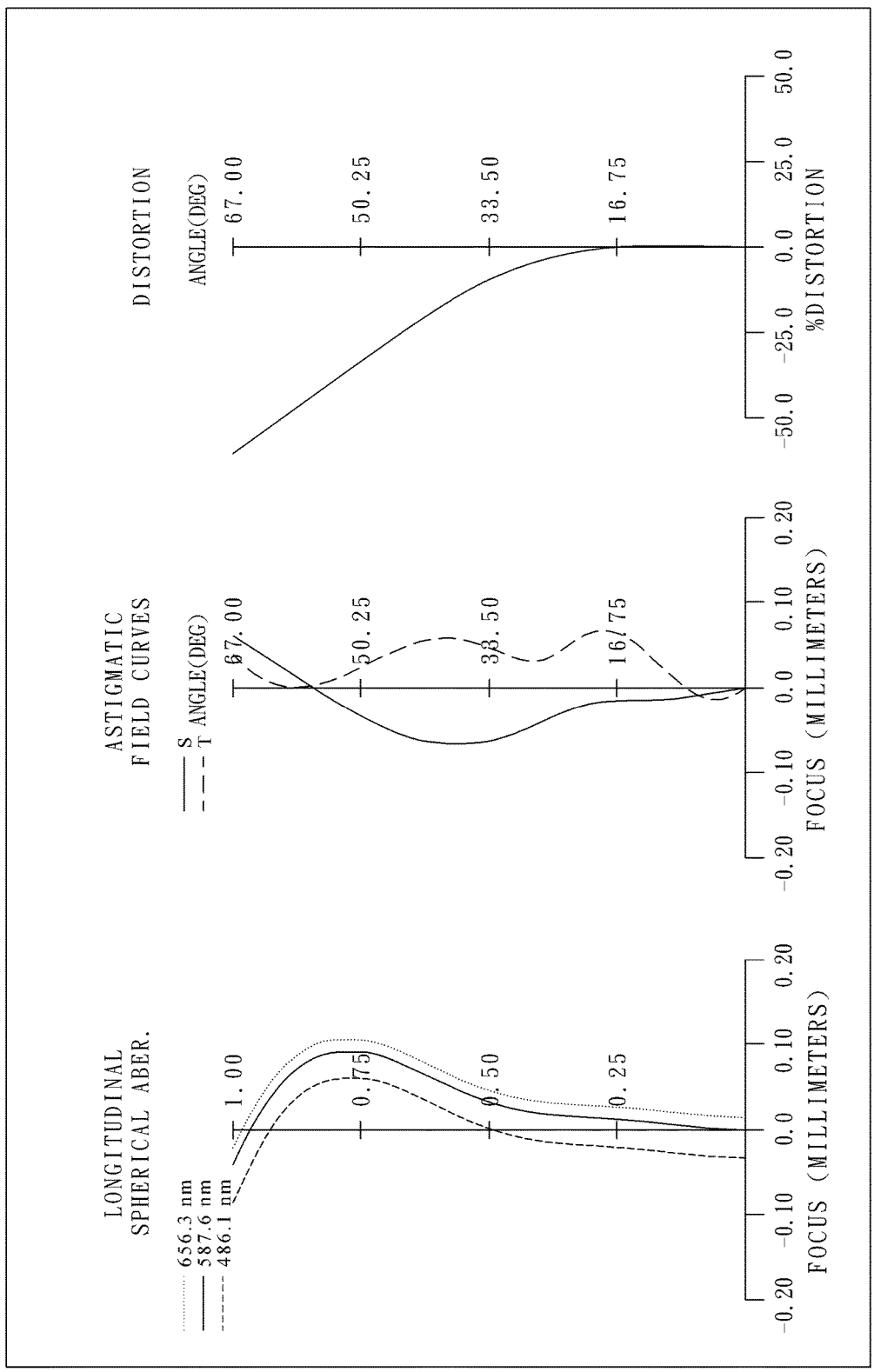
FIG. 3B shows longitudinal spherical aberration curves, astigmatic field curves and a distortion curve of the image capturing apparatus according to the 3rd embodiment.

FIG. 3A is a schematic view of an image capturing apparatus according to the 3rd embodiment of the present disclosure. FIG. 3B shows, in order from left to right, longitudinal spherical aberration curves, astigmatic field curves and a distortion curve of the image capturing apparatus according to the 3rd embodiment.

In FIG. 3A, the image capturing apparatus comprises an optical lens assembly (not otherwise herein labeled) of the present disclosure and an image sensor 370. The optical lens assembly comprises, in order from an object side to an image side, a first lens element 310, an aperture stop 300, a second lens element 320, a third lens element 330, and a fourth lens element 340.

The first lens element 310 with negative refractive power has an object-side surface 311 being convex in a paraxial region thereof and an image-side surface 312 being concave in a paraxial region thereof, which are both aspheric, and the first lens element 310 is made of plastic material.

The second lens element 320 with positive refractive power has an object-side surface 321 being convex in a paraxial region thereof and an image-side surface 322 being convex in a paraxial region thereof, which are both aspheric, and the second lens element 320 is made of plastic material.

The third lens element 330 with negative refractive power has an object-side surface 331 being concave in a paraxial region thereof and an image-side surface 332 being convex in a paraxial region thereof, which are both aspheric, and the third lens element 330 is made of plastic material.

The fourth lens element 340 with negative refractive power has an object-side surface 341 being convex in a paraxial region thereof and an image-side surface 342 being concave in a paraxial region thereof, which are both aspheric, and the fourth lens element 340 is made of plastic material. Furthermore, the image-side surface 342 of the fourth lens element 340 has at least one convex shape in an off-axis region thereof.

The optical lens assembly further comprises a filter 350 located between the fourth lens element 340 and an image surface 360. The filter 350 is made of glass material and will not affect the focal length of the optical lens assembly. The image sensor 370 is disposed on or near the image surface 360 of the optical lens assembly.

The detailed optical data of the 3rd embodiment are shown in TABLE 6, and the aspheric surface data are shown in TABLE 7, wherein the units of the curvature radius, the thickness and the focal length are expressed in mm, and HFOV is half of the maximum field of view.

TABLE 6

(3rd Embodiment)
f = 3.26 mm, Fno = 2.35, HFOV = 67.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 45.455 | ASP | 1.237 | Plastic | 1.544 | 55.9 | −7.98 |
| 2 | | 3.923 | ASP | 2.131 | | | | |
| 3 | Ape. Stop | Plano | | 0.134 | | | | |
| 4 | Lens 2 | 3.793 | ASP | 1.916 | Plastic | 1.544 | 55.9 | 2.46 |
| 5 | | −1.701 | ASP | 0.120 | | | | |
| 6 | Lens 3 | −5.761 | ASP | 0.889 | Plastic | 1.535 | 55.7 | −57.69 |
| 7 | | −7.464 | ASP | 0.280 | | | | |

TABLE 6-continued (3rd Embodiment)
f = 3.26 mm, Fno = 2.35, HFOV = 67.0 deg.

| Surface # | | Curvature Radius | | Thickness | Material | Index | Abbe # | Focal Length |
|---|---|---|---|---|---|---|---|---|
| 8 | Lens 4 | 17.522 | ASP | 0.664 | Plastic | 1.640 | 23.3 | −6.55 |
| 9 | | 3.330 | ASP | 0.450 | | | | |
| 10 | Filter | Plano | | 0.700 | Glass | 1.517 | 64.2 | — |
| 11 | | Plano | | 1.303 | | | | |
| 12 | Image Surface | Plano | | — | | | | |

Note:
Reference wavelength is d-line 587.6 nm

TABLE 7

Aspheric Coefficients

| | Surface # | | | |
|---|---|---|---|---|
| | 1 | 2 | 4 | 5 |
| k = | −9.0000E+01 | −5.0567E+01 | −7.5837E+01 | −2.4032E+00 |
| A4 = | 2.6023E−02 | 1.5070E−01 | 1.4426E−01 | 8.2830E−02 |
| A6 = | −7.0173E−03 | −9.6247E−02 | −2.5819E−01 | −4.3684E−02 |
| A8 = | 1.3866E−03 | 5.8049E−02 | 3.2743E−01 | −3.2178E−02 |
| A10 = | −2.0181E−04 | −2.2531E−02 | −2.6735E−01 | 3.9521E−02 |
| A12 = | 1.6431E−05 | 4.7548E−03 | 1.1803E−01 | −1.5453E−02 |
| A14 = | −5.4507E−07 | −3.9879E−04 | −2.0658E−02 | 2.1382E−03 |

| | Surface # | | | |
|---|---|---|---|---|
| | 6 | 7 | 8 | 9 |
| k = | −2.5794E+01 | 1.1939E+01 | −3.6060E+01 | −7.6093E−01 |
| A4 = | 9.7693E−02 | −2.2203E−01 | −3.1869E−01 | −1.3933E−01 |
| A6 = | −5.5760E−02 | 1.6094E−01 | 8.1974E−02 | 5.5184E−02 |
| A8 = | −5.4057E−03 | −7.6366E−02 | 5.1282E−02 | −1.3110E−02 |
| A10 = | 1.5580E−02 | 2.6249E−02 | −4.0969E−02 | 1.6995E−03 |
| A12 = | −6.5808E−03 | −6.2691E−03 | 1.0601E−02 | −1.0927E−04 |
| A14 = | 9.4097E−04 | 7.4560E−04 | −9.5102E−04 | 3.3346E−06 |

In the 3rd embodiment, the equation of the aspheric surface profiles of the aforementioned lens elements is the same as the equation of the 1st embodiment. Also, the definitions of these parameters shown in TABLE 8 below are the same as those stated in the 1st embodiment with corresponding values for the 3rd embodiment, so an explanation in this regard will not be provided again.

Moreover, these parameters can be calculated from TABLE 6 and TABLE 7 and satisfy the conditions stated in TABLE 8.

TABLE 8

3rd Embodiment

| f [mm] | 3.26 | CTmax/CTmin | 2.89 |
|---|---|---|---|
| Fno. | 2.35 | ATmax/ATmin | 18.88 |
| HFOV [deg.] | 67.0 | f/T12 | 1.44 |
| tan(HFOV) | 2.36 | R8/f | 1.02 |
| λ [nm] | 587.6 | (R1 + R2)/(R1 − R2) | 1.19 |
| T23/T12 | 0.05 | (R3 + R4)/(R3 − R4) | 0.38 |
| T12/CT2 | 1.18 | |f1/f2| | 3.24 |
| CT2/CT4 | 2.89 | |P3| + |P4| | 0.55 |
| (CT3 + CT4)/CT2 | 0.81 | (|P3| + |P4|)/(|P1| + |P2|) | 0.32 |
| ΣCT/CT2 | 2.46 | SL/TL | 0.66 |

4th Embodiment

Figure 4A:
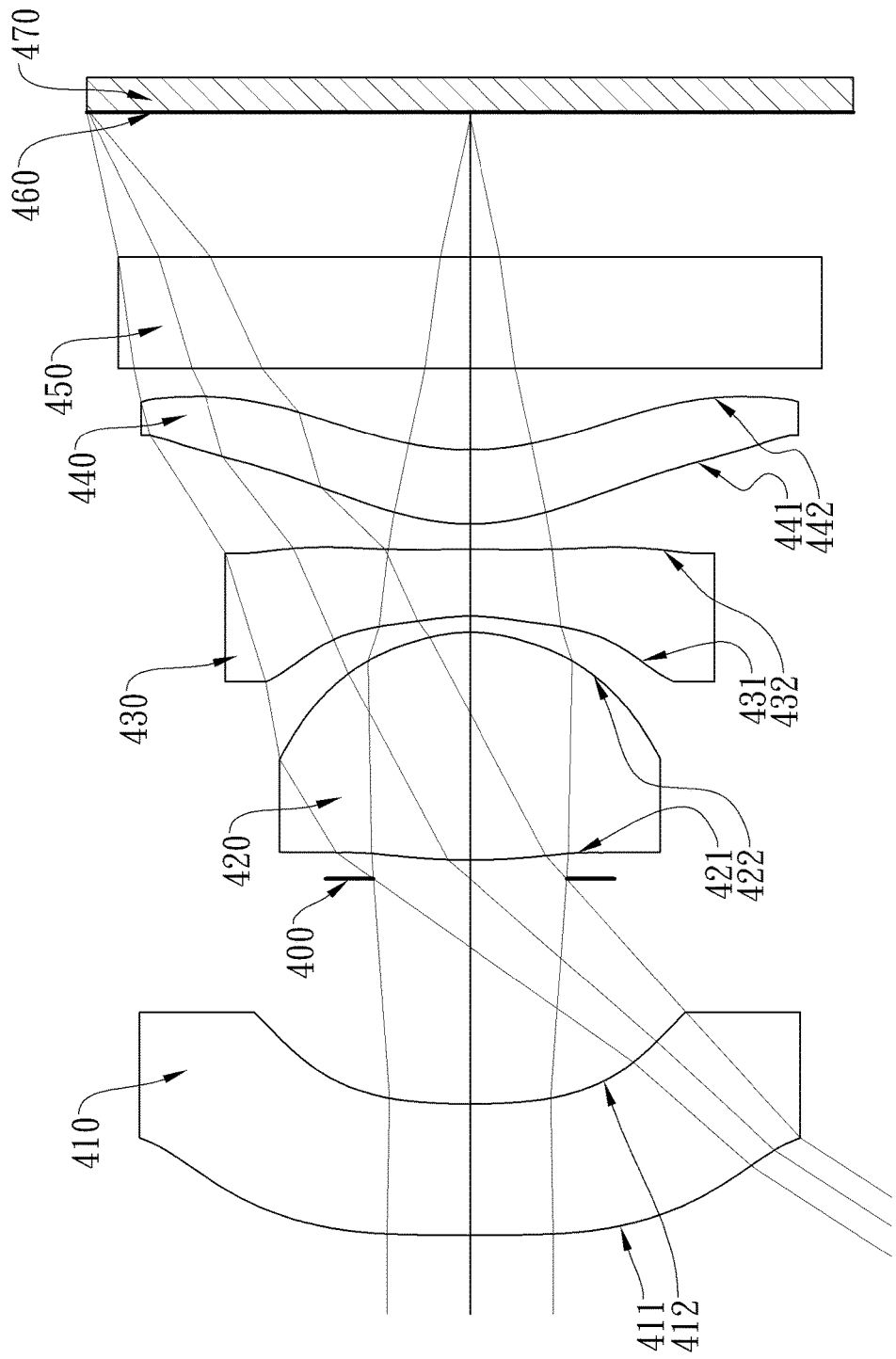
FIG. 4A is a schematic view of an image capturing apparatus according to the 4th embodiment of the present disclosure.
Figure 4B:
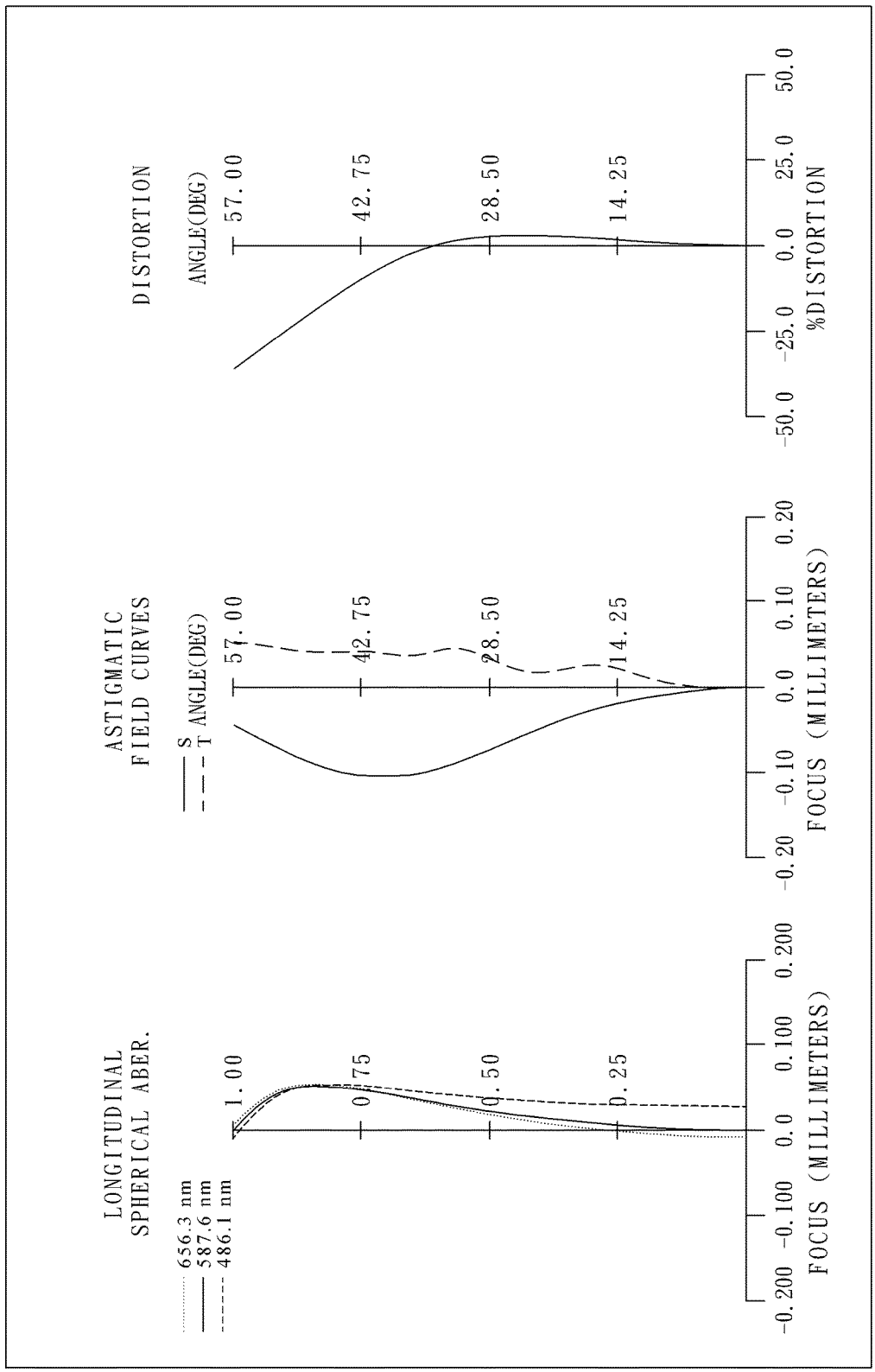
FIG. 4B shows longitudinal spherical aberration curves, astigmatic field curves and a distortion curve of the image capturing apparatus according to the 4th embodiment.

FIG. 4A is a schematic view of an image capturing apparatus according to the 4th embodiment of the present disclosure. FIG. 4B shows, in order from left to right, longitudinal spherical aberration curves, astigmatic field curves and a distortion curve of the image capturing apparatus according to the 4th embodiment.

In FIG. 4A, the image capturing apparatus comprises an optical lens assembly (not otherwise herein labeled) of the present disclosure and an image sensor 470. The optical lens assembly comprises, in order from an object side to an image side, a first lens element 410, an aperture stop 400, a second lens element 420, a third lens element 430, and a fourth lens element 440.

The first lens element 410 with negative refractive power has an object-side surface 411 being convex in a paraxial region thereof and an image-side surface 412 being concave in a paraxial region thereof, which are both aspheric, and the first lens element 410 is made of plastic material.

The second lens element 420 with positive refractive power has an object-side surface 421 being convex in a paraxial region thereof and an image-side surface 422 being convex in a paraxial region thereof, which are both aspheric, and the second lens element 420 is made of plastic material.

The third lens element 430 with negative refractive power has an object-side surface 431 being concave in a paraxial region thereof and an image-side surface 432 being convex in a paraxial region thereof, which are both aspheric, and the third lens element 430 is made of plastic material.

The fourth lens element 440 with positive refractive power has an object-side surface 441 being convex in a paraxial region thereof and an image-side surface 442 being concave in a paraxial region thereof, which are both aspheric, and the fourth lens element 440 is made of plastic material. Furthermore, the image-side surface 442 of the fourth lens element 440 has at least one convex shape in an off-axis region thereof.

The optical lens assembly further comprises a filter 450 located between the fourth lens element 440 and an image surface 460. The filter 450 is made of glass material and will not affect the focal length of the optical lens assembly. The image sensor 470 is disposed on or near the image surface 460 of the optical lens assembly.

The detailed optical data of the 4th embodiment are shown in TABLE 9, and the aspheric surface data are shown in TABLE 10, wherein the units of the curvature radius, the thickness and the focal length are expressed in mm, and HFOV is half of the maximum field of view.

TABLE 9

(4th Embodiment)
f = 2.49 mm, Fno = 2.38, HFOV = 57.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 37.037 | ASP | 0.825 | Plastic | 1.544 | 56.0 | −9.39 |
| 2 | | 4.454 | ASP | 1.418 | | | | |
| 3 | Ape. Stop | Plano | | 0.119 | | | | |
| 4 | Lens 2 | 3.821 | ASP | 1.435 | Plastic | 1.544 | 56.0 | 1.55 |
| 5 | | −0.940 | ASP | 0.100 | | | | |
| 6 | Lens 3 | −1.415 | ASP | 0.420 | Plastic | 1.660 | 20.4 | −2.51 |
| 7 | | −10.855 | ASP | 0.161 | | | | |
| 8 | Lens 4 | 1.447 | ASP | 0.466 | Plastic | 1.544 | 56.0 | 9.06 |
| 9 | | 1.816 | ASP | 0.513 | | | | |
| 10 | Filter | Plano | | 0.700 | Glass | 1.517 | 64.2 | — |
| 11 | | Plano | | 0.913 | | | | |
| 12 | Image Surface | Plano | | — | | | | |

Note:
Reference wavelength is d-line 587.6 nm

TABLE 10

Aspheric Coefficients

| | Surface # | | | |
|---|---|---|---|---|
| | 1 | 2 | 4 | 5 |
| k = | −9.0000E+01 | −1.0000E+02 | −2.1931E+01 | −7.4292E−01 |
| A4 = | 7.4370E−02 | 2.4191E−01 | −6.5459E−03 | 6.7713E−01 |
| A6 = | −1.7438E−02 | −8.2712E−02 | 1.4430E−03 | −1.5352E+00 |
| A8 = | 1.0010E−03 | −4.2087E−02 | −3.3353E−01 | 1.6911E+00 |
| A10 = | 1.5968E−03 | 1.2039E−01 | 7.5674E−01 | −9.8303E−01 |
| A12 = | −5.4823E−04 | −7.4689E−02 | −1.2918E+00 | 2.4648E−01 |
| A14 = | 4.9435E−05 | 1.4240E−02 | 9.4339E−01 | −1.1139E−02 |

| | Surface # | | | |
|---|---|---|---|---|
| | 6 | 7 | 8 | 9 |
| k = | −3.4185E−01 | −1.0000E+02 | −7.7398E−01 | −7.2408E−01 |
| A4 = | 9.7224E−01 | 2.6320E−01 | −1.2652E−01 | −5.3179E−02 |
| A6 = | −2.0550E+00 | −4.1440E−01 | 3.0823E−02 | −2.6914E−02 |
| A8 = | 2.3818E+00 | 3.0497E−01 | −9.6254E−03 | 2.0126E−02 |
| A10 = | −1.7453E+00 | −1.3160E−01 | 2.7422E−03 | −7.0692E−03 |
| A12 = | 7.3731E−01 | 3.2562E−02 | −3.8313E−04 | 1.3234E−03 |
| A14 = | −1.2978E−01 | −3.4717E−03 | 1.5584E−05 | −1.0096E−04 |

In the 4th embodiment, the equation of the aspheric surface profiles of the aforementioned lens elements is the same as the equation of the 1st embodiment. Also, the definitions of these parameters shown in TABLE 11 below are the same as those stated in the 1st embodiment with corresponding values for the 4th embodiment, so an explanation in this regard will not be provided again.

Moreover, these parameters can be calculated from TABLE 9 and TABLE 10 and satisfy the conditions stated in TABLE 11.

TABLE 11

| 4th Embodiment | | | |
|---|---|---|---|
| f [mm] | 2.49 | CTmax/CTmin | 3.42 |
| Fno. | 2.38 | ATmax/ATmin | 15.37 |
| HFOV [deg.] | 57.0 | f/T12 | 1.62 |
| tan(HFOV) | 1.54 | R8/f | 0.73 |
| λ [nm] | 587.6 | (R1 + R2)/(R1 − R2) | 1.27 |
| T23/T12 | 0.07 | (R3 + R4)/(R3 − R4) | 0.60 |
| T12/CT2 | 1.07 | \|f1/f2\| | 6.05 |
| CT2/CT4 | 3.08 | \|P3\| + \|P4\| | 1.27 |
| (CT3 + CT4)/CT2 | 0.62 | (\|P3\| + \|P4\|)/(\|P1\| + \|P2\|) | 0.68 |
| ΣCT/CT2 | 2.19 | SL/TL | 0.68 |

5th Embodiment

Figure 5A:
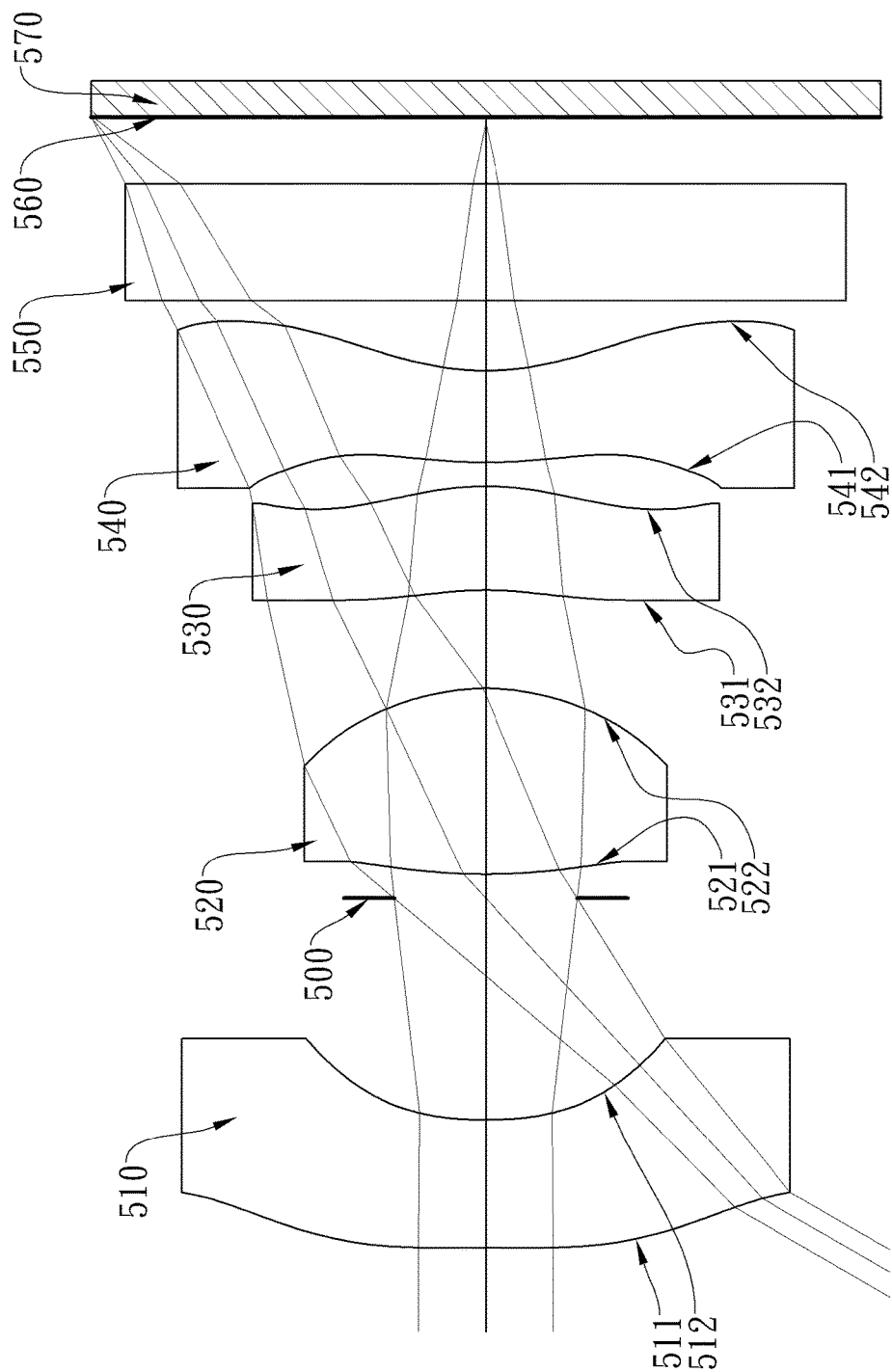
FIG. 5A is a schematic view of an image capturing apparatus according to the 5th embodiment of the present disclosure.
Figure 5B:
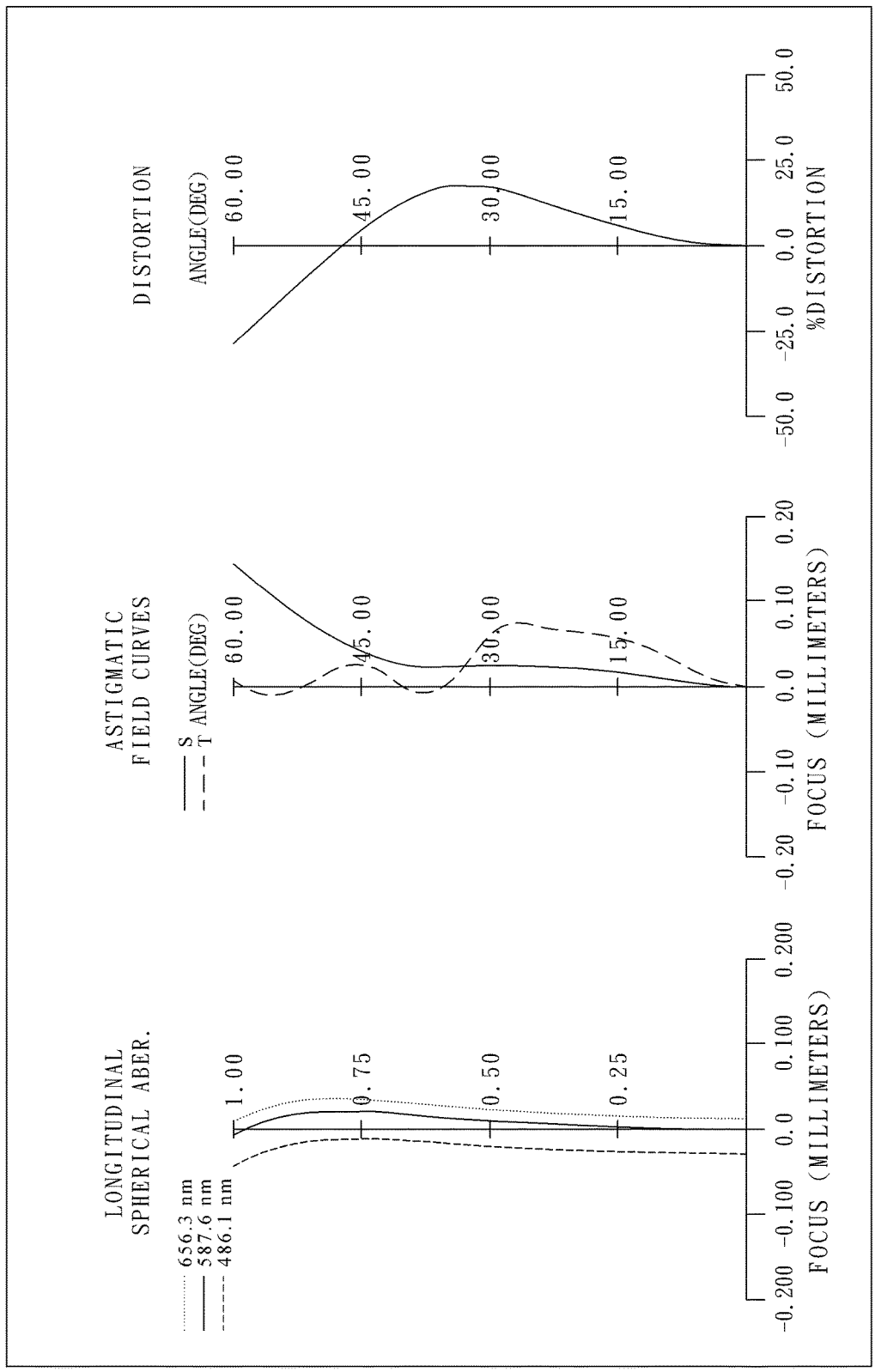
FIG. 5B shows longitudinal spherical aberration curves, astigmatic field curves and a distortion curve of the image capturing apparatus according to the 5th embodiment.

FIG. 5A is a schematic view of an image capturing apparatus according to the 5th embodiment of the present disclosure. FIG. 5B shows, in order from left to right, longitudinal spherical aberration curves, astigmatic field curves and a distortion curve of the image capturing apparatus according to the 5th embodiment.

In FIG. 5A, the image capturing apparatus comprises an optical lens assembly (not otherwise herein labeled) of the present disclosure and an image sensor 570. The optical lens assembly comprises, in order from an object side to an image side, a first lens element 510, an aperture stop 500, a second lens element 520, a third lens element 530, and a fourth lens element 540.

The first lens element 510 with negative refractive power has an object-side surface 511 being concave in a paraxial region thereof and an image-side surface 512 being concave in a paraxial region thereof, which are both aspheric, and the first lens element 510 is made of plastic material.

The second lens element 520 with positive refractive power has an object-side surface 521 being convex in a paraxial region thereof and an image-side surface 522 being convex in a paraxial region thereof, which are both aspheric, and the second lens element 520 is made of plastic material.

The third lens element 530 with positive refractive power has an object-side surface 531 being concave in a paraxial region thereof and an image-side surface 532 being convex in a paraxial region thereof, which are both aspheric, and the third lens element 530 is made of plastic material.

The fourth lens element 540 with negative refractive power has an object-side surface 541 being convex in a paraxial region thereof and an image-side surface 542 being concave in a paraxial region thereof, which are both aspheric, and the fourth lens element 540 is made of plastic material. Furthermore, the image-side surface 542 of the fourth lens element 540 has at least one convex shape in an off-axis region thereof.

The optical lens assembly further comprises a filter 550 located between the fourth lens element 540 and an image surface 560. The filter 550 is made of glass material and will not affect the focal length of the optical lens assembly. The image sensor 570 is disposed on or near the image surface 560 of the optical lens assembly.

The detailed optical data of the 5th embodiment are shown in TABLE 12, and the aspheric surface data are shown in TABLE 13, wherein the units of the curvature radius, the thickness and the focal length are expressed in mm, and HFOV is half of the maximum field of view.

TABLE 12

(5th Embodiment)
f = 1.94 mm, Fno = 2.40, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −39.986 | ASP | 0.770 | Plastic | 1.544 | 55.9 | −4.01 |
| 2 | | 2.231 | ASP | 1.326 | | | | |
| 3 | Ape. Stop | Plano | | 0.144 | | | | |
| 4 | Lens 2 | 3.195 | ASP | 1.116 | Plastic | 1.544 | 55.9 | 1.99 |
| 5 | | −1.437 | ASP | 0.588 | | | | |
| 6 | Lens 3 | −2.266 | ASP | 0.626 | Plastic | 1.535 | 55.7 | 8.97 |
| 7 | | −1.688 | ASP | 0.143 | | | | |
| 8 | Lens 4 | 2.941 | ASP | 0.550 | Plastic | 1.640 | 23.3 | −7.47 |
| 9 | | 1.688 | ASP | 0.420 | | | | |
| 10 | Filter | Plano | | 0.700 | Glass | 1.517 | 64.2 | — |
| 11 | | Plano | | 0.400 | | | | |
| 12 | Image Surface | Plano | | — | | | | |

Note:
Reference wavelength is d-line 587.6 nm

TABLE 13

Aspheric Coefficients

| | Surface # | | | |
|---|---|---|---|---|
| | 1 | 2 | 4 | 5 |
| k = | −8.9548E+01 | −2.9409E+00 | −5.7029E+01 | 1.8764E−01 |
| A4 = | 1.4806E−01 | 2.4889E−01 | 1.6191E−01 | 8.0079E−02 |
| A6 = | −8.3923E−02 | 2.5605E−01 | −5.0193E−01 | −4.3654E−02 |
| A8 = | 3.6596E−02 | −9.6298E−01 | 8.5874E−01 | −1.0582E−02 |
| A10 = | −1.2125E−02 | 1.2772E+00 | −9.0979E−01 | 1.5989E−02 |
| A12 = | 2.2387E−03 | −8.4210E−01 | 3.9963E−01 | 4.2874E−04 |
| A14 = | −1.6678E−04 | 2.2635E−01 | 4.0746E−02 | 9.3406E−04 |

| | Surface # | | | |
|---|---|---|---|---|
| | 6 | 7 | 8 | 9 |
| k = | 8.6970E−02 | −1.0400E+00 | −4.5060E−01 | −2.7360E−01 |
| A4 = | 3.1587E−01 | 1.9163E−01 | −1.7230E−01 | −5.1439E−02 |
| A6 = | −2.3627E−01 | −7.0081E−02 | 9.1784E−02 | −8.8954E−02 |
| A8 = | 2.1671E−01 | 1.1811E−01 | −2.0389E−01 | 6.0375E−02 |
| A10 = | −2.2962E−01 | −1.4135E−01 | 1.8002E−01 | −2.0021E−02 |
| A12 = | 1.3286E−01 | 7.4073E−02 | −5.8173E−02 | 3.5143E−03 |
| A14 = | −2.8086E−02 | −1.4298E−02 | 5.2450E−03 | −2.9355E−04 |

In the 5th embodiment, the equation of the aspheric surface profiles of the aforementioned lens elements is the same as the equation of the 1st embodiment. Also, the definitions of these parameters shown in TABLE 14 below are the same as those stated in the 1st embodiment with corresponding values for the 5th embodiment, so an explanation in this regard will not be provided again.

Moreover, these parameters can be calculated from TABLE 12 and TABLE 13 and satisfy the conditions stated in TABLE 14.

TABLE 14

| 5th Embodiment | | | |
|---|---|---|---|
| f [mm] | 1.94 | CTmax/CTmin | 2.03 |
| Fno. | 2.40 | ATmax/ATmin | 10.28 |
| HFOV [deg.] | 60.0 | f/T12 | 1.32 |
| tan(HFOV) | 1.73 | R8/f | 0.87 |

TABLE 14-continued

| 5th Embodiment | | | |
|---|---|---|---|
| λ [nm] | 587.6 | (R1 + R2)/(R1 − R2) | 0.89 |
| T23/T12 | 0.40 | (R3 + R4)/(R3 − R4) | 0.38 |
| T12/CT2 | 1.32 | \|f1/f2\| | 2.01 |
| CT2/CT4 | 2.03 | \|P3\| + \|P4\| | 0.48 |
| (CT3 + CT4)/CT2 | 1.05 | (\|P3\| + \|P4\|)/(\|P1\| + \|P2\|) | 0.33 |
| ΣCT/CT2 | 2.74 | SL/TL | 0.69 |

6th Embodiment

Figure 6A:
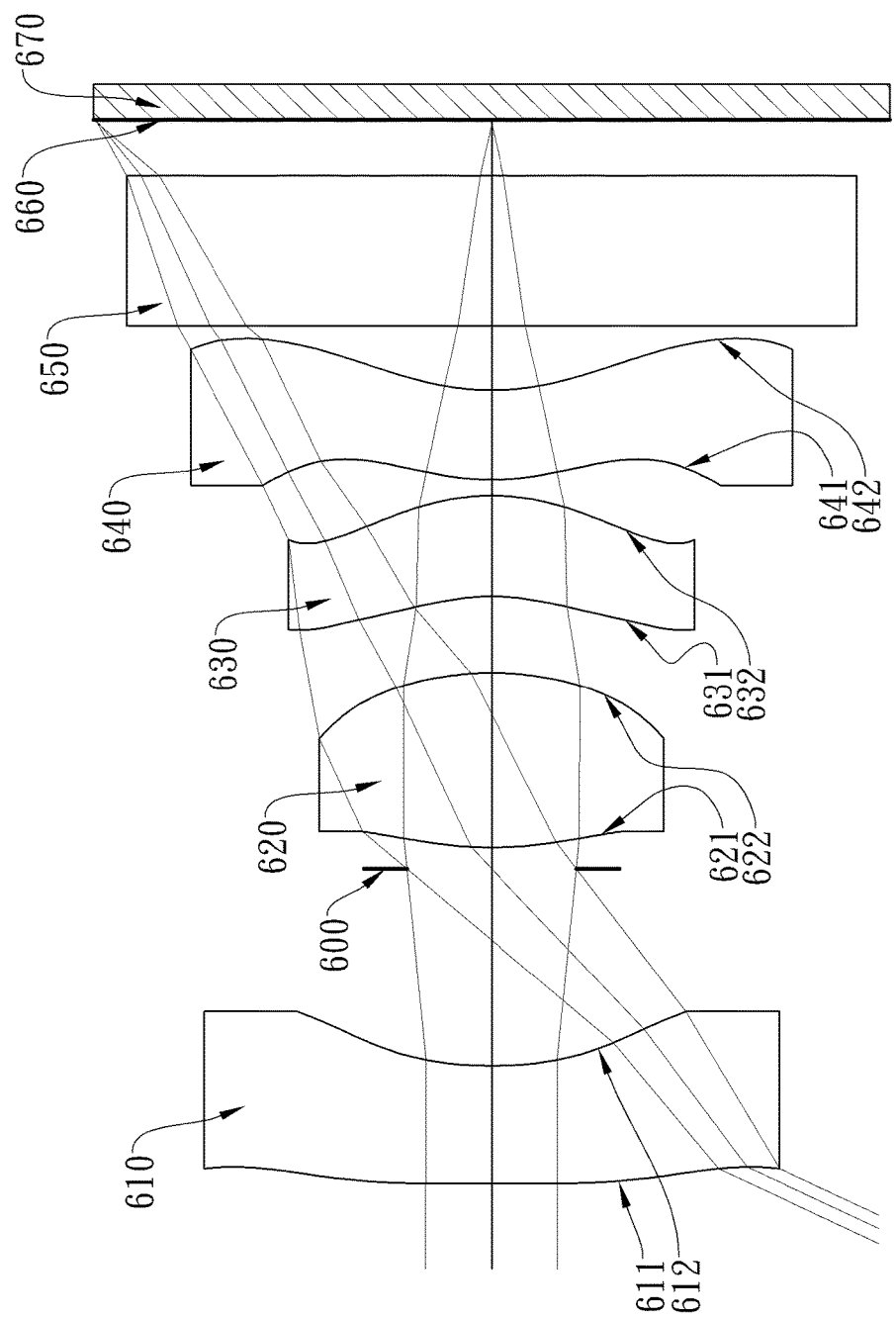
FIG. 6A is a schematic view of an image capturing apparatus according to the 6th embodiment of the present disclosure.
Figure 6B:
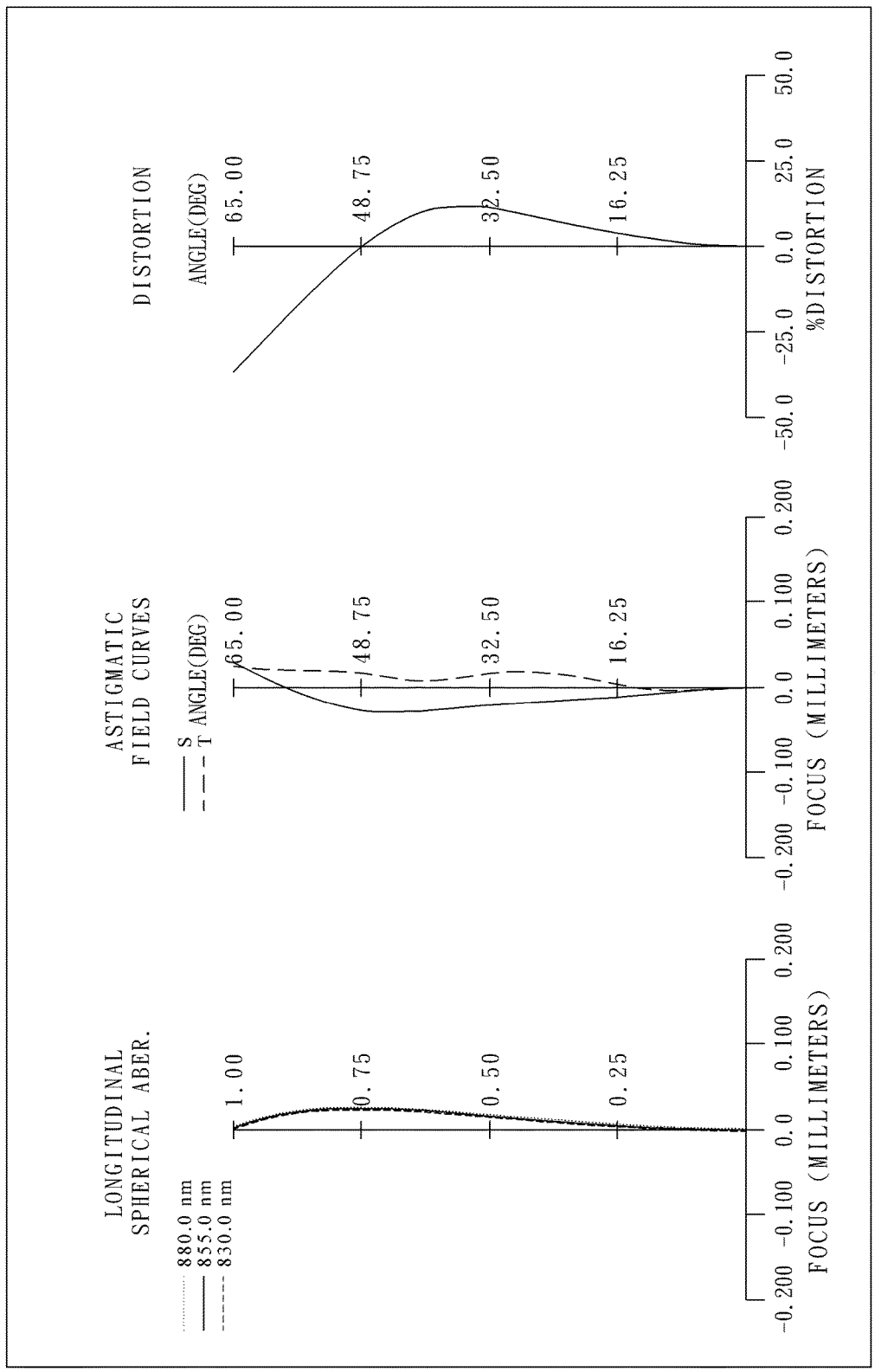
FIG. 6B shows longitudinal spherical aberration curves, astigmatic field curves and a distortion curve of the image capturing apparatus according to the 6th embodiment.

FIG. 6A is a schematic view of an image capturing apparatus according to the 6th embodiment of the present disclosure. FIG. 6B shows, in order from left to right, longitudinal spherical aberration curves, astigmatic field curves and a distortion curve of the image capturing apparatus according to the 6th embodiment.

In FIG. 6A, the image capturing apparatus comprises an optical lens assembly (not otherwise herein labeled) of the present disclosure and an image sensor 670. The optical lens assembly comprises, in order from an object side to an image side, a first lens element 610, an aperture stop 600, a second lens element 620, a third lens element 630, and a fourth lens element 640.

The first lens element 610 with negative refractive power has an object-side surface 611 being concave in a paraxial region thereof and an image-side surface 612 being concave in a paraxial region thereof, which are both aspheric, and the first lens element 610 is made of plastic material.

The second lens element 620 with positive refractive power has an object-side surface 621 being convex in a paraxial region thereof and an image-side surface 622 being convex in a paraxial region thereof, which are both aspheric, and the second lens element 620 is made of plastic material.

The third lens element 630 with positive refractive power has an object-side surface 631 being concave in a paraxial region thereof and an image-side surface 632 being convex in a paraxial region thereof, which are both aspheric, and the third lens element 630 is made of plastic material.

The fourth lens element 640 with positive refractive power has an object-side surface 641 being convex in a paraxial region thereof and an image-side surface 642 being concave in a paraxial region thereof, which are both aspheric, and the fourth lens element 640 is made of plastic material. Furthermore, the image-side surface 642 of the fourth lens element 640 has at least one convex shape in an off-axis region thereof.

The optical lens assembly further comprises a filter 650 located between the fourth lens element 640 and an image surface 660. The filter 650 is made of glass material and will not affect the focal length of the optical lens assembly. The image sensor 670 is disposed on or near the image surface 660 of the optical lens assembly.

The detailed optical data of the 6th embodiment are shown in TABLE 15, and the aspheric surface data are shown in TABLE 16, wherein the units of the curvature radius, the thickness and the focal length are expressed in mm, and HFOV is half of the maximum field of view.

TABLE 15

(6th Embodiment)
f = 1.39 mm, Fno = 2.25, HFOV = 65.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −26.460 | ASP | 0.550 | Plastic | 1.537 | 55.9 | −3.24 |
| 2 | | 1.875 | ASP | 0.922 | | | | |
| 3 | Ape. Stop | Plano | | 0.100 | | | | |
| 4 | Lens 2 | 1.765 | ASP | 0.817 | Plastic | 1.537 | 55.9 | 1.60 |
| 5 | | −1.395 | ASP | 0.357 | | | | |
| 6 | Lens 3 | −1.046 | ASP | 0.471 | Plastic | 1.527 | 55.7 | 12.70 |
| 7 | | −1.045 | ASP | 0.074 | | | | |
| 8 | Lens 4 | 1.195 | ASP | 0.420 | Plastic | 1.619 | 23.3 | 15.58 |
| 9 | | 1.181 | ASP | 0.300 | | | | |
| 10 | Filter | Plano | | 0.700 | Glass | 1.510 | 64.2 | — |
| 11 | | Plano | | 0.262 | | | | |
| 12 | Image Surface | Plano | | — | | | | |

Note:
Reference wavelength is 855.0 nm

TABLE 16

| Aspheric Coefficients | | | | |
|---|---|---|---|---|
| | Surface # | | | |
| | 1 | 2 | 4 | 5 |
| k = | −7.2668E+01 | −4.4156E+01 | −3.3839E+01 | 5.4861E−01 |
| A4 = | 2.1975E−01 | 9.8144E−01 | 5.3492E−01 | 1.8092E−01 |
| A6 = | −2.4431E−01 | −2.3159E+00 | −2.9867E+00 | −4.8245E−01 |
| A8 = | 1.8195E−01 | 4.2399E+00 | 9.3755E+00 | −1.3473E−02 |
| A10 = | −1.0751E−01 | −6.0180E+00 | −1.9186E+01 | 1.5793E−01 |
| A12 = | 3.6727E−02 | 4.8819E+00 | 1.6183E+01 | 1.7362E−02 |
| A14 = | −5.0906E−03 | −1.6126E+00 | 3.2340E+00 | 7.4138E−02 |
| | Surface # | | | |
| | 6 | 7 | 8 | 9 |
| k = | −8.5087E−01 | −6.2538E−01 | −4.4639E+00 | −6.1600E−01 |
| A4 = | 9.1549E−01 | 1.5426E−01 | −2.4577E−01 | −2.0505E−01 |
| A6 = | −1.6999E+00 | −1.9343E−02 | −1.2083E−01 | −1.3377E−01 |
| A8 = | 3.0342E+00 | 1.1771E+00 | 1.0507E−01 | 2.0359E−01 |
| A10 = | −5.0798E+00 | −2.8298E+00 | −2.1117E−01 | −1.2457E−01 |
| A12 = | 5.3801E+00 | 2.9997E+00 | 3.2619E−01 | 3.7870E−02 |
| A14 = | −2.2292E+00 | −1.1349E+00 | −1.3536E−01 | −4.9277E−03 |

In the 6th embodiment, the equation of the aspheric surface profiles of the aforementioned lens elements is the same as the equation of the 1st embodiment. Also, the definitions of these parameters shown in TABLE 17 below are the same as those stated in the 1st embodiment with corresponding values for the 6th embodiment, so an explanation in this regard will not be provided again.

Moreover, these parameters can be calculated from TABLE 15 and TABLE 16 and satisfy the conditions stated in TABLE 17.

TABLE 17

6th Embodiment

| | | | |
|---|---|---|---|
| f [mm] | 1.39 | CTmax/CTmin | 1.95 |
| Fno. | 2.25 | ATmax/ATmin | 13.81 |
| HFOV [deg.] | 65.0 | f/T12 | 1.36 |
| tan(HFOV) | 2.14 | R8/f | 0.85 |
| λ [nm] | 855.0 | (R1 + R2)/(R1 − R2) | 0.87 |
| T23/T12 | 0.35 | (R3 + R4)/(R3 − R4) | 0.12 |
| T12/CT2 | 1.25 | |f1/f2| | 2.03 |
| CT2/CT4 | 1.95 | |P3| + |P4| | 0.20 |
| (CT3 + CT4)/CT2 | 1.09 | (|P3| + |P4|)/(|P1| + |P2|) | 0.15 |
| ΣCT/CT2 | 2.76 | SL/TL | 0.70 |

7th Embodiment

Figure 7A:
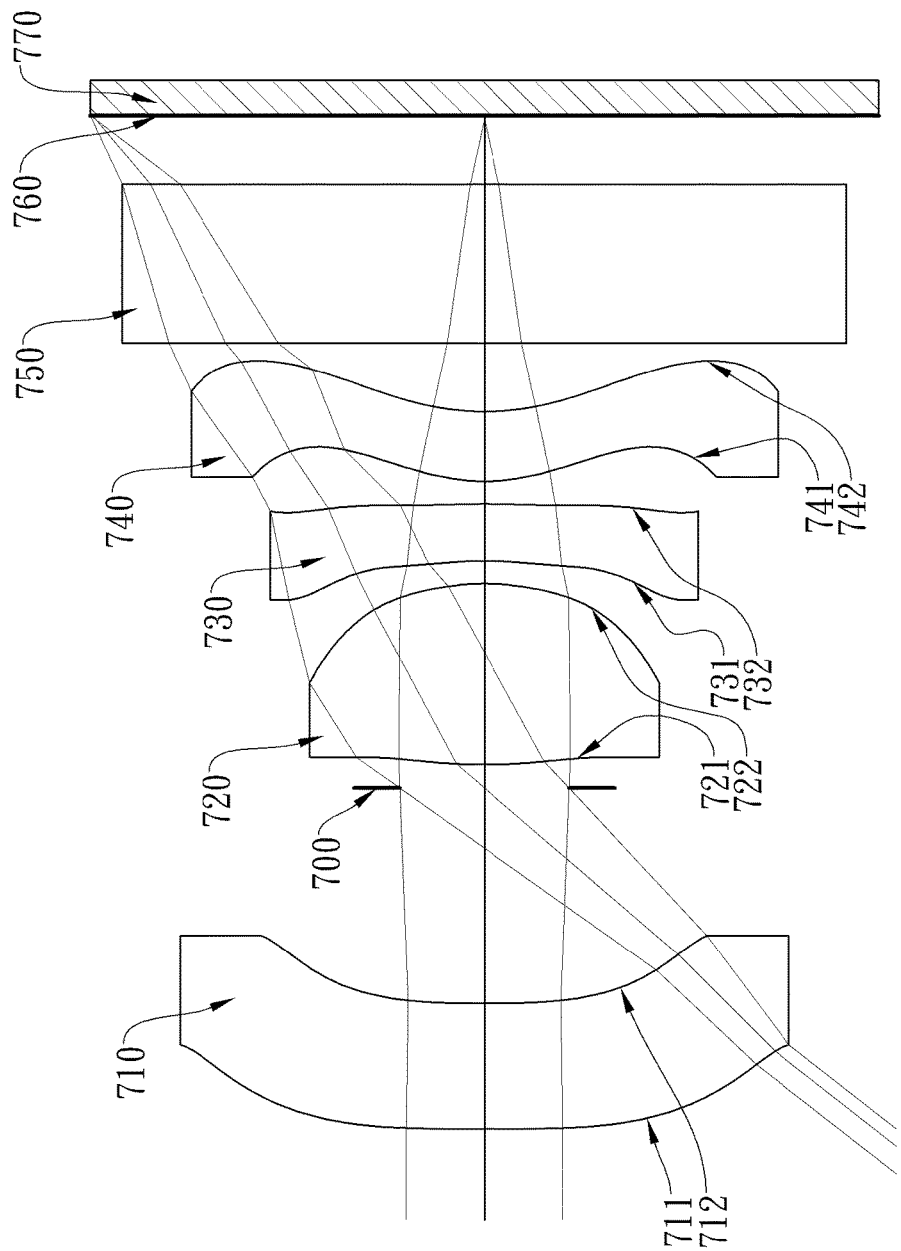
FIG. 7A is a schematic view of an image capturing apparatus according to the 7th embodiment of the present disclosure.
Figure 7B:
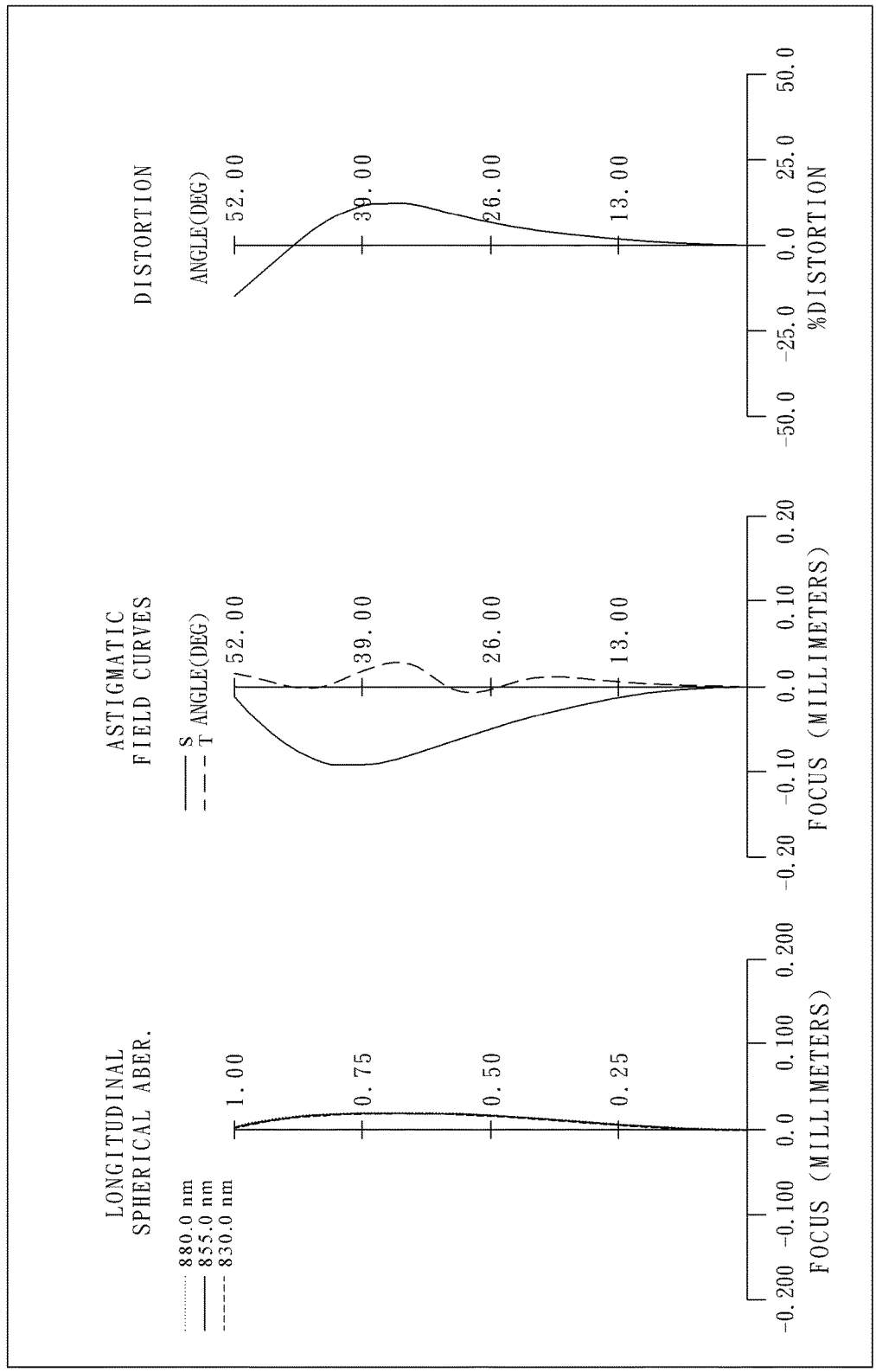
FIG. 7B shows longitudinal spherical aberration curves, astigmatic field curves and a distortion curve of the image capturing apparatus according to the 7th embodiment.

FIG. 7A is a schematic view of an image capturing apparatus according to the 7th embodiment of the present disclosure. FIG. 7B shows, in order from left to right, longitudinal spherical aberration curves, astigmatic field curves and a distortion curve of the image capturing apparatus according to the 7th embodiment.

In FIG. 7A, the image capturing apparatus comprises an optical lens assembly (not otherwise herein labeled) of the present disclosure and an image sensor 770. The optical lens assembly comprises, in order from an object side to an image side, a first lens element 710, an aperture stop 700, a second lens element 720, a third lens element 730, and a fourth lens element 740.

The first lens element 710 with negative refractive power has an object-side surface 711 being convex in a paraxial region thereof and an image-side surface 712 being concave in a paraxial region thereof, which are both aspheric, and the first lens element 710 is made of plastic material.

The second lens element 720 with positive refractive power has an object-side surface 721 being convex in a paraxial region thereof and an image-side surface 722 being convex in a paraxial region thereof, which are both aspheric, and the second lens element 720 is made of plastic material.

The third lens element 730 with negative refractive power has an object-side surface 731 being concave in a paraxial region thereof and an image-side surface 732 being convex in a paraxial region thereof, which are both aspheric, and the third lens element 730 is made of plastic material.

The fourth lens element 740 with positive refractive power has an object-side surface 741 being convex in a paraxial region thereof and an image-side surface 742 being concave in a paraxial region thereof, which are both aspheric, and the fourth lens element 740 is made of plastic material. Furthermore, the image-side surface 742 of the fourth lens element 740 has at least one convex shape in an off-axis region thereof.

The optical lens assembly further comprises a filter 750 located between the fourth lens element 740 and an image surface 760. The filter 750 is made of glass material and will not affect the focal length of the optical lens assembly. The image sensor 770 is disposed on or near the image surface 760 of the optical lens assembly.

The detailed optical data of the 7th embodiment are shown in TABLE 18, and the aspheric surface data are shown in TABLE 19, wherein the units of the curvature radius, the thickness and the focal length are expressed in mm, and HFOV is half of the maximum field of view.

TABLE 18

(7th Embodiment)
f = 1.58 mm, Fno = 2.30, HFOV = 52.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 44.511 | ASP | 0.550 | Plastic | 1.537 | 55.9 | −11.77 |
| 2 | | 5.506 | ASP | 0.948 | | | | |
| 3 | Ape. Stop | Plano | | 0.103 | | | | |
| 4 | Lens 2 | 2.352 | ASP | 0.796 | Plastic | 1.537 | 55.9 | 1.47 |
| 5 | | −1.052 | ASP | 0.100 | | | | |
| 6 | Lens 3 | −1.411 | ASP | 0.250 | Plastic | 1.619 | 23.3 | −4.10 |
| 7 | | −3.393 | ASP | 0.100 | | | | |
| 8 | Lens 4 | 0.876 | ASP | 0.306 | Plastic | 1.537 | 55.9 | 5.13 |
| 9 | | 1.129 | ASP | 0.300 | | | | |
| 10 | Filter | Plano | | 0.700 | Glass | 1.510 | 64.2 | — |
| 11 | | Plano | | 0.300 | | | | |
| 12 | Image Surface | Plano | | — | | | | |

Note:
Reference wavelength is 855.0 nm

TABLE 19

Aspheric Coefficients

| Surface # | | | | |
|---|---|---|---|---|
| | 1 | 2 | 4 | 5 |
| k = | −9.0000E+01 | −1.9992E+01 | −7.4928E+01 | 2.4317E−01 |
| A4 = | 1.9632E−01 | 2.7969E−01 | 4.5468E−01 | 1.0791E+00 |
| A6 = | −9.4357E−02 | 5.4624E−01 | −4.1859E+00 | −6.6209E+00 |
| A8 = | 6.5137E−02 | −2.6041E+00 | 2.5038E+01 | 1.1171E+01 |
| A10 = | −4.3074E−02 | 5.5304E+00 | −1.2390E+02 | 2.6644E+00 |
| A12 = | 2.8272E−02 | −5.3632E+00 | 3.0586E+02 | −3.0023E+01 |
| A14 = | −9.2573E−03 | 1.8413E+00 | −2.7197E+02 | 2.5053E+01 |

| Surface # | | | | |
|---|---|---|---|---|
| | 6 | 7 | 8 | 9 |
| k = | 9.9652E−02 | 1.0411E+01 | −3.0275E+00 | −4.3559E−01 |
| A4 = | 2.6450E+00 | 1.1907E+00 | −1.3540E+00 | −9.5302E−02 |
| A6 = | −1.2062E+01 | −4.1044E+00 | −7.2669E−01 | −6.3134E−01 |
| A8 = | 2.6499E+01 | 6.9366E+00 | 1.4313E+00 | 9.1597E−01 |
| A10 = | −3.5783E+01 | −6.5758E+00 | −1.9692E+00 | −7.0986E−01 |

TABLE 19-continued

| Aspheric Coefficients | | | | |
|---|---|---|---|---|
| A12 = | 3.0144E+01 | 3.6651E+00 | 1.5560E+00 | 2.8841E−01 |
| A14 = | −1.1454E+01 | −8.7593E−01 | −5.1143E−01 | −5.1069E−02 |

In the 7th embodiment, the equation of the aspheric surface profiles of the aforementioned lens elements is the same as the equation of the 1st embodiment. Also, the definitions of these parameters shown in TABLE 20 below are the same as those stated in the 1st embodiment with corresponding values for the 7th embodiment, so an explanation in this regard will not be provided again.

Moreover, these parameters can be calculated from TABLE 18 and TABLE 19 and satisfy the conditions stated in TABLE 20.

TABLE 20

| 7th Embodiment | | | |
|---|---|---|---|
| f [mm] | 1.58 | CTmax/CTmin | 3.18 |
| Fno. | 2.30 | ATmax/ATmin | 10.51 |
| HFOV [deg.] | 52.0 | f/T12 | 1.50 |
| tan(HFOV) | 1.28 | R8/f | 0.71 |
| λ [nm] | 855.0 | (R1 + R2)/(R1 − R2) | 1.28 |
| T23/T12 | 0.10 | (R3 + R4)/(R3 − R4) | 0.38 |
| T12/CT2 | 1.32 | |f1/f2| | 7.98 |
| CT2/CT4 | 2.60 | |P3| + |P4| | 0.69 |
| (CT3 + CT4)/CT2 | 0.70 | (|P3| + |P4|)/(|P1| + |P2|) | 0.58 |
| ΣCT/CT2 | 2.39 | SL/TL | 0.66 |

8th Embodiment

Figure 8A:
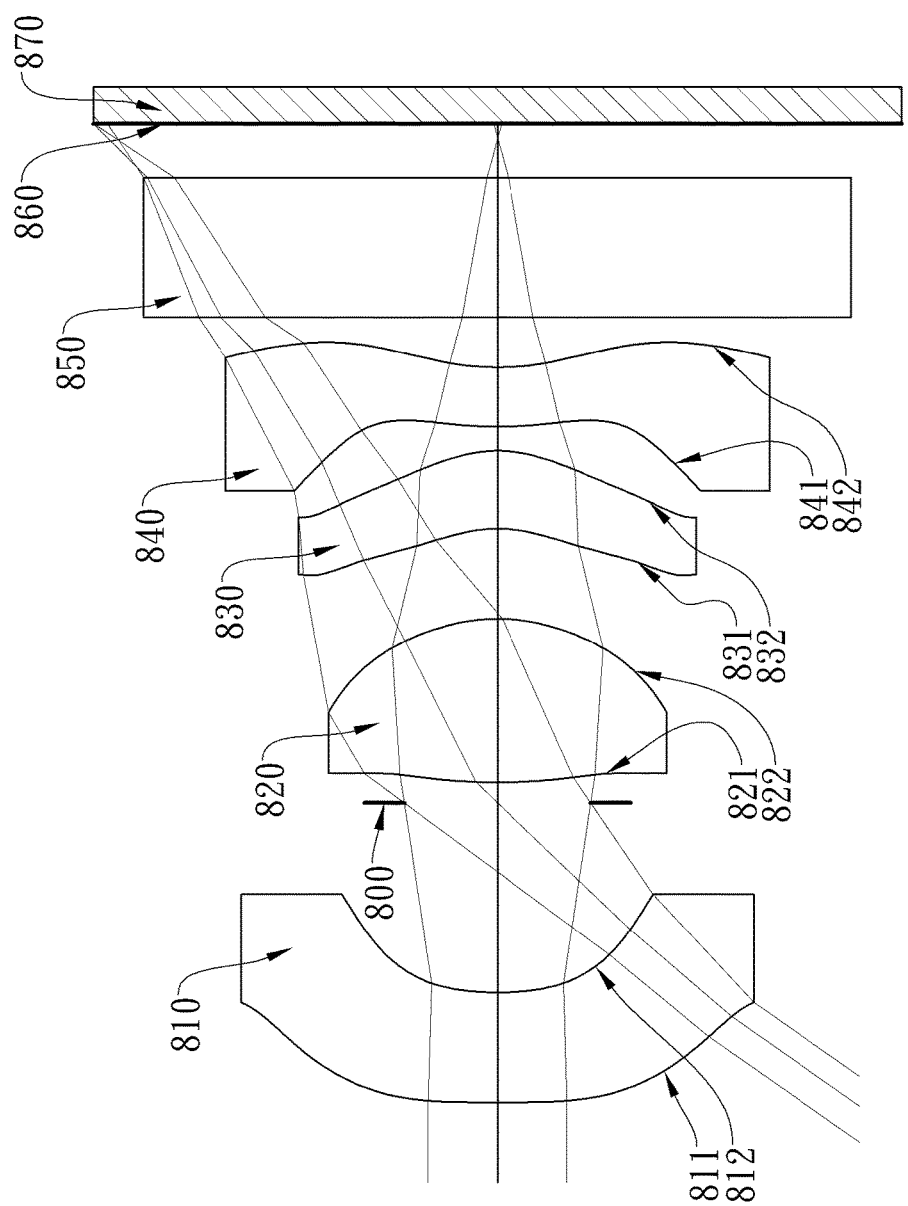
FIG. 8A is a schematic view of an image capturing apparatus according to the 8th embodiment of the present disclosure.
Figure 8B:
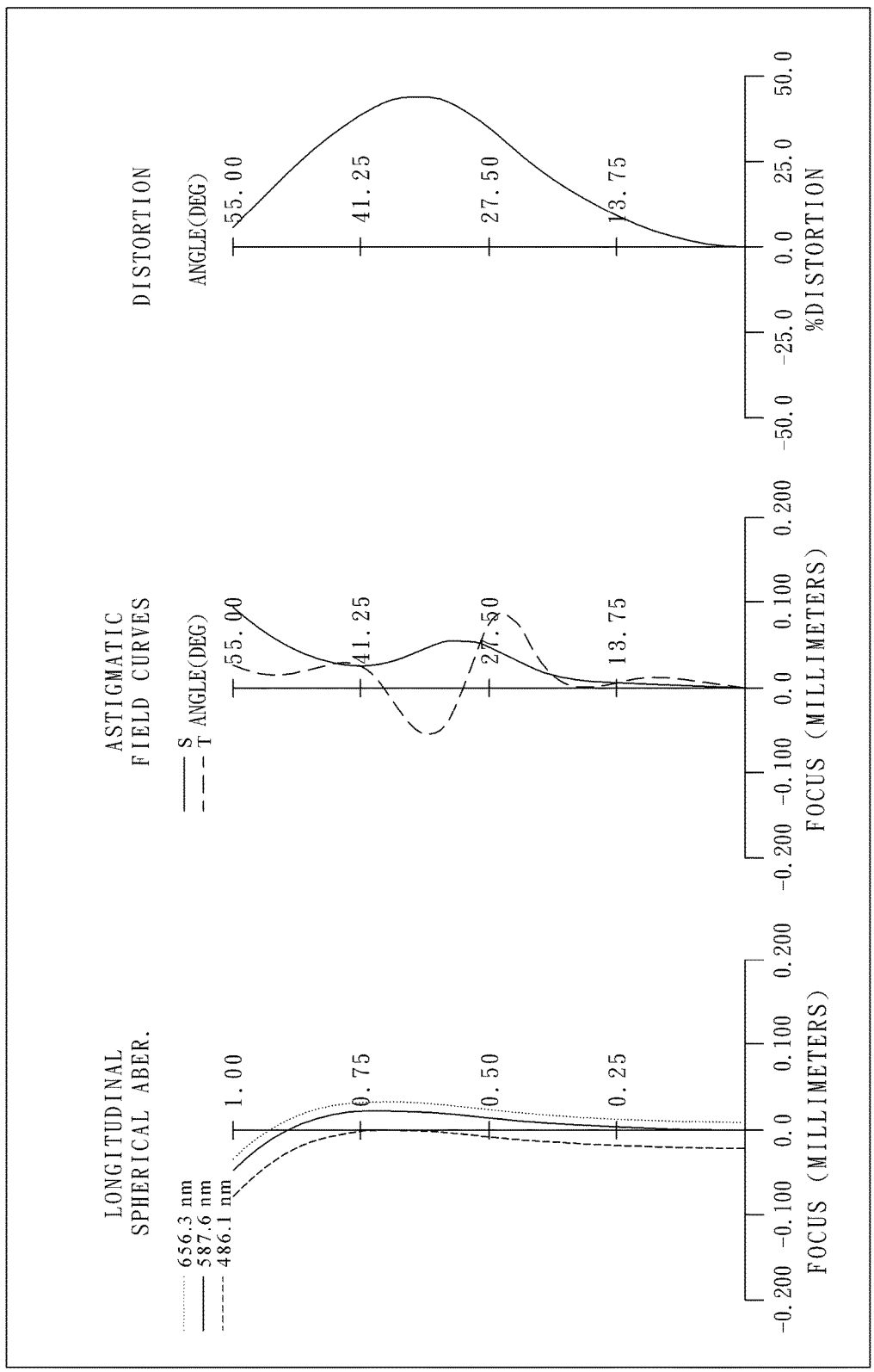
FIG. 8B shows longitudinal spherical aberration curves, astigmatic field curves and a distortion curve of the image capturing apparatus according to the 8th embodiment.

FIG. 8A is a schematic view of an image capturing apparatus according to the 8th embodiment of the present disclosure. FIG. 8B shows, in order from left to right, longitudinal spherical aberration curves, astigmatic field curves and a distortion curve of the image capturing apparatus according to the 8th embodiment.

In FIG. 8A, the image capturing apparatus comprises an optical lens assembly (not otherwise herein labeled) of the present disclosure and an image sensor 870. The optical lens assembly comprises, in order from an object side to an image side, a first lens element 810, an aperture stop 800, a second lens element 820, a third lens element 830, and a fourth lens element 840.

The first lens element 810 with negative refractive power has an object-side surface 811 being convex in a paraxial region thereof and an image-side surface 812 being concave in a paraxial region thereof, which are both aspheric, and the first lens element 810 is made of plastic material.

The second lens element 820 with positive refractive power has an object-side surface 821 being convex in a paraxial region thereof and an image-side surface 822 being convex in a paraxial region thereof, which are both aspheric, and the second lens element 820 is made of plastic material.

The third lens element 830 with positive refractive power has an object-side surface 831 being concave in a paraxial region thereof and an image-side surface 832 being convex in a paraxial region thereof, which are both aspheric, and the third lens element 830 is made of plastic material.

The fourth lens element 840 with negative refractive power has an object-side surface 841 being convex in a paraxial region thereof and an image-side surface 842 being concave in a paraxial region thereof, which are both aspheric, and the fourth lens element 840 is made of plastic material. Furthermore, the image-side surface 842 of the fourth lens element 840 has at least one convex shape in an off-axis region thereof.

The optical lens assembly further comprises a filter 850 located between the fourth lens element 840 and an image surface 860. The filter 850 is made of glass material and will not affect the focal length of the optical lens assembly. The image sensor 870 is disposed on or near the image surface 860 of the optical lens assembly.

The detailed optical data of the 8th embodiment are shown in TABLE 21, and the aspheric surface data are shown in TABLE 22, wherein the units of the curvature radius, the thickness and the focal length are expressed in mm, and HFOV is half of the maximum field of view.

TABLE 21

(8th Embodiment)
f = 1.32 mm, Fno = 1.90, HFOV = 55.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 44.263 | ASP | 0.550 | Plastic | 1.544 | 55.9 | −2.92 |
| 2 | | 1.529 | ASP | 0.949 | | | | |
| 3 | Ape. Stop | Plano | | 0.102 | | | | |
| 4 | Lens 2 | 2.371 | ASP | 0.820 | Plastic | 1.544 | 55.9 | 1.34 |
| 5 | | −0.920 | ASP | 0.451 | | | | |
| 6 | Lens 3 | −0.672 | ASP | 0.389 | Plastic | 1.535 | 55.7 | 6.04 |
| 7 | | −0.669 | ASP | 0.120 | | | | |
| 8 | Lens 4 | 1.707 | ASP | 0.297 | Plastic | 1.640 | 23.3 | −8.58 |
| 9 | | 1.214 | ASP | 0.250 | | | | |
| 10 | Filter | Plano | | 0.700 | Glass | 1.517 | 64.2 | — |
| 11 | | Plano | | 0.269 | | | | |
| 12 | Image Surface | Plano | | — | | | | |

Note:
Reference wavelength is d-line 587.6 nm

TABLE 22

| Aspheric Coefficients | | | | |
|---|---|---|---|---|
| Surface # | | | | |
| | 1 | 2 | 4 | 5 |
| k = | −9.0000E+01 | 1.2099E+00 | −6.6685E+01 | −3.0484E−01 |
| A4 = | 5.0916E−01 | 5.7441E−01 | 4.5005E−01 | 3.0482E−01 |

TABLE 22-continued

| Aspheric Coefficients |           |           |           |           |
|---|---|---|---|---|
| A6 =  | −4.2967E−01 | 3.9896E+00 | −2.8656E+00 | −4.3127E−01 |
| A8 =  | 1.9485E−01  | −2.4753E+01 | 9.4693E+00 | 4.8277E−02 |
| A10 = | 9.6723E−02  | 7.1172E+01 | −2.0239E+01 | −9.4504E−02 |
| A12 = | −1.3703E−01 | −9.6552E+01 | 1.6183E+01 | 1.7362E−02 |
| A14 = | 3.5013E−02  | 4.8569E+01 | 3.2340E+00 | 7.4138E−02 |

| | Surface # | | | |
|---|---|---|---|---|
| | 6 | 7 | 8 | 9 |
| k =   | −2.6099E+00 | −1.1595E+00 | −1.8453E+01 | −4.6344E−01 |
| A4 =  | 1.0811E+00  | 7.8158E−01  | −2.0861E−01 | −4.1052E−01 |
| A6 =  | −1.8947E+00 | −5.9503E−01 | −7.6730E−01 | −5.0906E−02 |
| A8 =  | 2.3479E+00  | 6.8642E−01  | −5.5382E−01 | 2.4976E−01 |
| A10 = | −4.4397E+00 | −2.3792E+00 | 2.2409E+00  | −1.7822E−01 |
| A12 = | 5.3801E+00  | 2.9997E+00  | −1.2605E+00 | 5.8905E−02 |
| A14 = | −2.2292E+00 | −1.1349E+00 | 8.5477E−02  | −8.3437E−03 |

In the 8th embodiment, the equation of the aspheric surface profiles of the aforementioned lens elements is the same as the equation of the 1st embodiment. Also, the definitions of these parameters shown in TABLE 23 below are the same as those stated in the 1st embodiment with corresponding values for the 8th embodiment, so an explanation in this regard will not be provided again.

Moreover, these parameters can be calculated from TABLE 21 and TABLE 22 and satisfy the conditions stated in TABLE 23.

TABLE 23

| 8th Embodiment | | | |
|---|---|---|---|
| f [mm] | 1.32 | CTmax/CTmin | 2.76 |
| Fno. | 1.90 | ATmax/ATmin | 8.76 |
| HFOV [deg.] | 55.0 | f/T12 | 1.26 |
| tan(HFOV) | 1.43 | R8/f | 0.92 |
| λ [nm] | 587.6 | (R1 + R2)/(R1 − R2) | 1.07 |
| T23/T12 | 0.43 | (R3 + R4)/(R3 − R4) | 0.44 |
| T12/CT2 | 1.28 | \|f1/f2\| | 2.19 |
| CT2/CT4 | 2.76 | \|P3\| + \|P4\| | 0.37 |
| (CT3 + CT4)/CT2 | 0.84 | (\|P3\| + \|P4\|)/(\|P1\| + \|P2\|) | 0.26 |
| ΣCT/CT2 | 2.51 | SL/TL | 0.69 |

9th Embodiment

Figure 9A:
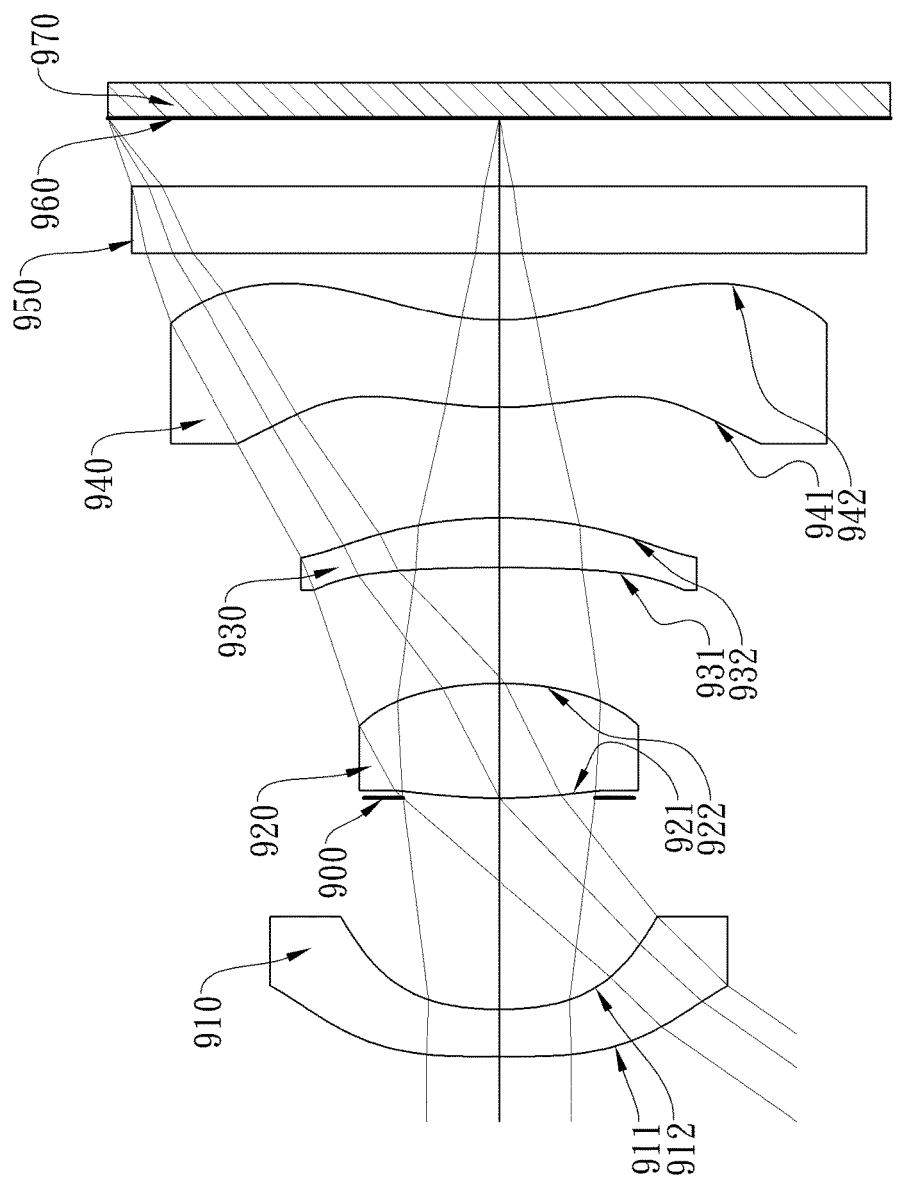
FIG. 9A is a schematic view of an image capturing apparatus according to the 9th embodiment of the present disclosure.
Figure 9B:
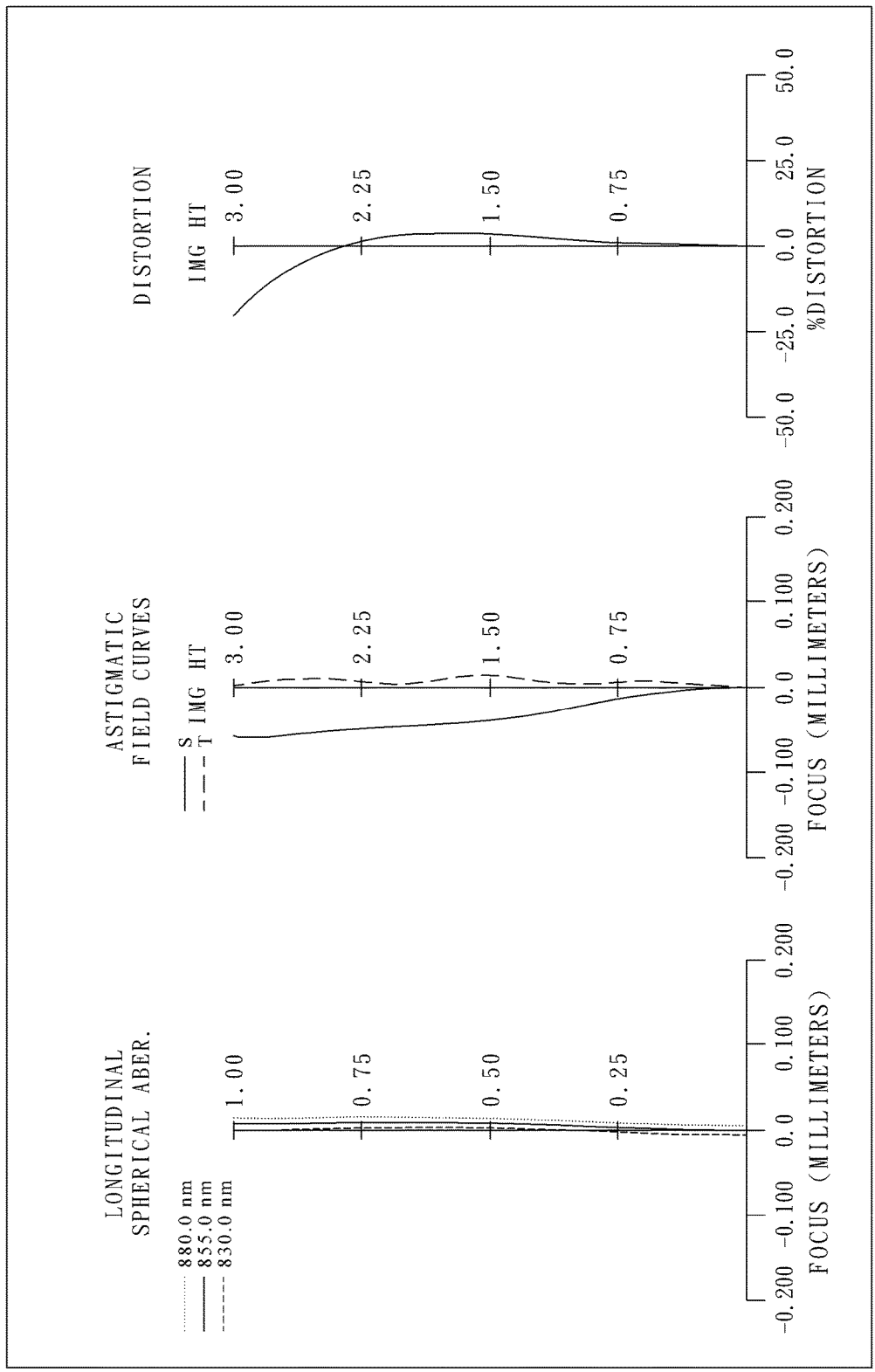
FIG. 9B shows longitudinal spherical aberration curves, astigmatic field curves and a distortion curve of the image capturing apparatus according to the 9th embodiment.

FIG. 9A is a schematic view of an image capturing apparatus according to the 9th embodiment of the present disclosure. FIG. 9B shows, in order from left to right, longitudinal spherical aberration curves, astigmatic field curves and a distortion curve of the image capturing apparatus according to the 9th embodiment.

In FIG. 9A, the image capturing apparatus comprises an optical lens assembly (not otherwise herein labeled) of the present disclosure and an image sensor 970. The optical lens assembly comprises, in order from an object side to an image side, a first lens element 910, an aperture stop 900, a second lens element 920, a third lens element 930, and a fourth lens element 940.

The first lens element 910 with negative refractive power has an object-side surface 911 being convex in a paraxial region thereof and an image-side surface 912 being concave in a paraxial region thereof, which are both aspheric, and the first lens element 910 is made of plastic material.

The second lens element 920 with positive refractive power has an object-side surface 921 being convex in a paraxial region thereof and an image-side surface 922 being convex in a paraxial region thereof, which are both aspheric, and the second lens element 920 is made of plastic material.

The third lens element 930 with positive refractive power has an object-side surface 931 being concave in a paraxial region thereof and an image-side surface 932 being convex in a paraxial region thereof, which are both aspheric, and the third lens element 930 is made of plastic material.

The fourth lens element 940 with negative refractive power has an object-side surface 941 being convex in a paraxial region thereof and an image-side surface 942 being concave in a paraxial region thereof, which are both aspheric, and the fourth lens element 940 is made of plastic material. Furthermore, the image-side surface 942 of the fourth lens element 940 has at least one convex shape in an off-axis region thereof.

The optical lens assembly further comprises a filter 950 located between the fourth lens element 940 and an image surface 960. The filter 950 is made of glass material and will not affect the focal length of the optical lens assembly. The image sensor 970 is disposed on or near the image surface 960 of the optical lens assembly.

The detailed optical data of the 9th embodiment are shown in TABLE 24, and the aspheric surface data are shown in TABLE 25, wherein the units of the curvature radius, the thickness and the focal length are expressed in mm, and HFOV is half of the maximum field of view.

TABLE 24

| (9th Embodiment) f = 2.67 mm, Fno = 2.40, HFOV = 55.0 deg. | | | | | | | |
|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | 75.784 | ASP | 0.361 | Plastic | 1.505 | 56.5 | −5.53 |
| 2 |  | 2.687 | ASP | 1.624 | | | | |
| 3 | Ape. Stop | Plano | | −0.003 | | | | |
| 4 | Lens 2 | 4.106 | ASP | 0.880 | Plastic | 1.505 | 56.5 | 3.28 |
| 5 |  | −2.576 | ASP | 0.891 | | | | |
| 6 | Lens 3 | −14.522 | ASP | 0.381 | Plastic | 1.631 | 21.4 | 7.14 |
| 7 |  | −3.473 | ASP | 0.847 | | | | |
| 8 | Lens 4 | 2.880 | ASP | 0.669 | Plastic | 1.619 | 23.5 | −14.51 |
| 9 |  | 1.987 | ASP | 0.515 | | | | |
| 10 | Filter | Plano | | 0.515 | Glass | 1.510 | 64.2 | — |

TABLE 24-continued (9th Embodiment)
f = 2.67 mm, Fno = 2.40, HFOV = 55.0 deg.

| Surface # | | Curvature Radius | Thickness | Material | Index | Abbe # | Focal Length |
|---|---|---|---|---|---|---|---|
| 11 | | Plano | 0.520 | | | | |
| 12 | Image Surface | Plano | — | | | | |

Note:
Reference wavelength is 855.0 nm

TABLE 25

Aspheric Coefficients

| Surface # | | | | |
|---|---|---|---|---|
| | 1 | 2 | 4 | 5 |
| k = | 1.4719E+01 | 8.8049E−01 | −3.5473E+01 | 3.7296E+00 |
| A4 = | 1.7011E−01 | 2.2489E−01 | 3.3659E−02 | 1.6977E−03 |
| A6 = | −9.5870E−02 | −4.1515E−02 | −5.9360E−02 | −1.7820E−02 |
| A8 = | 4.7431E−02 | −3.1300E−02 | −3.7330E−02 | 1.8878E−02 |
| A10 = | −1.5726E−02 | 8.2942E−02 | 1.2144E−01 | −2.3758E−02 |
| A12 = | 2.6518E−03 | −4.6170E−02 | −1.4767E−01 | 1.3256E−02 |
| A14 = | −1.7633E−04 | 6.1023E−03 | 3.6411E−02 | −3.2940E−03 |

| Surface # | | | | |
|---|---|---|---|---|
| | 6 | 7 | 8 | 9 |
| k = | 7.7590E+01 | −1.0436E+00 | −1.0690E+00 | −4.9250E−01 |
| A4 = | 2.1931E−03 | −8.1103E−03 | −9.4425E−02 | −7.5909E−02 |
| A6 = | −1.3290E−02 | 5.5830E−03 | 9.8673E−03 | 1.2564E−03 |
| A8 = | −2.0045E−03 | −5.9950E−03 | −1.2385E−02 | 2.9182E−03 |
| A10 = | 3.8561E−03 | 2.6738E−03 | 7.5539E−03 | −9.3643E−04 |
| A12 = | −1.7587E−03 | 5.5679E−04 | −1.5817E−03 | 1.2524E−04 |
| A14 = | 3.0152E−04 | −2.5467E−04 | 1.1150E−04 | −6.7578E−06 |

In the 9th embodiment, the equation of the aspheric surface profiles of the aforementioned lens elements is the same as the equation of the 1st embodiment. Also, the definitions of these parameters shown in TABLE 26 below are the same as those stated in the 1st embodiment with corresponding values for the 9th embodiment, so an explanation in this regard will not be provided again.

Moreover, these parameters can be calculated from TABLE 24 and TABLE 25 and satisfy the conditions stated in TABLE 26.

TABLE 26

9th Embodiment

| f [mm] | 2.67 | CTmax/CTmin | 2.44 |
|---|---|---|---|
| Fno. | 2.40 | ATmax/ATmin | 1.91 |
| HFOV [deg.] | 55.0 | f/T12 | 1.64 |
| tan(HFOV) | 1.43 | R8/f | 0.75 |
| λ [nm] | 855.0 | (R1 + R2)/(R1 − R2) | 1.07 |
| T23/T12 | 0.55 | (R3 + R4)/(R3 − R4) | 0.23 |
| T12/CT2 | 1.84 | |f1/f2| | 1.68 |
| CT2/CT4 | 1.32 | |P3| + |P4| | 0.56 |
| (CT3 + CT4)/CT2 | 1.19 | (|P3| + |P4|)/(|P1| + |P2|) | 0.43 |
| ΣCT/CT2 | 2.60 | SL/TL | 0.72 |

10th Embodiment

Figure 10A:
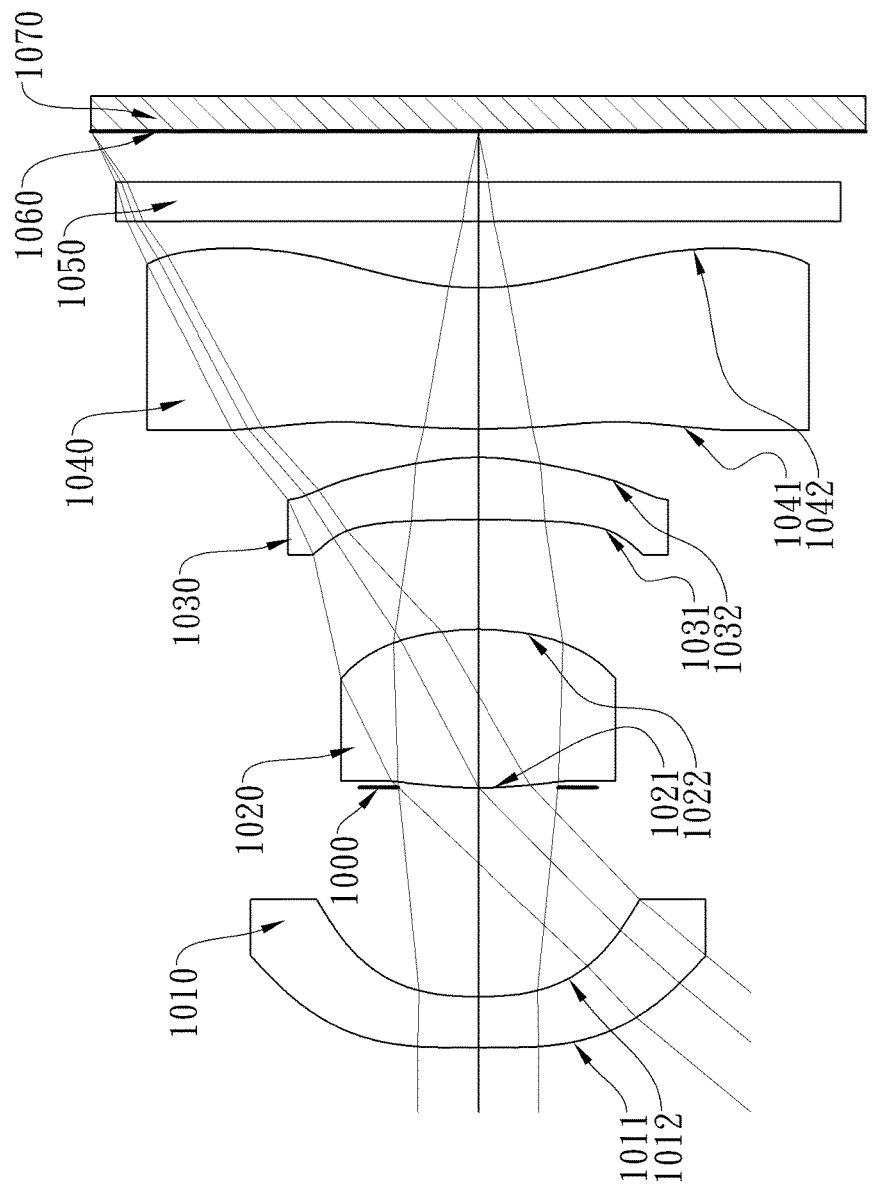
FIG. 10A is a schematic view of an image capturing apparatus according to the 10th embodiment of the present disclosure.
Figure 10B:
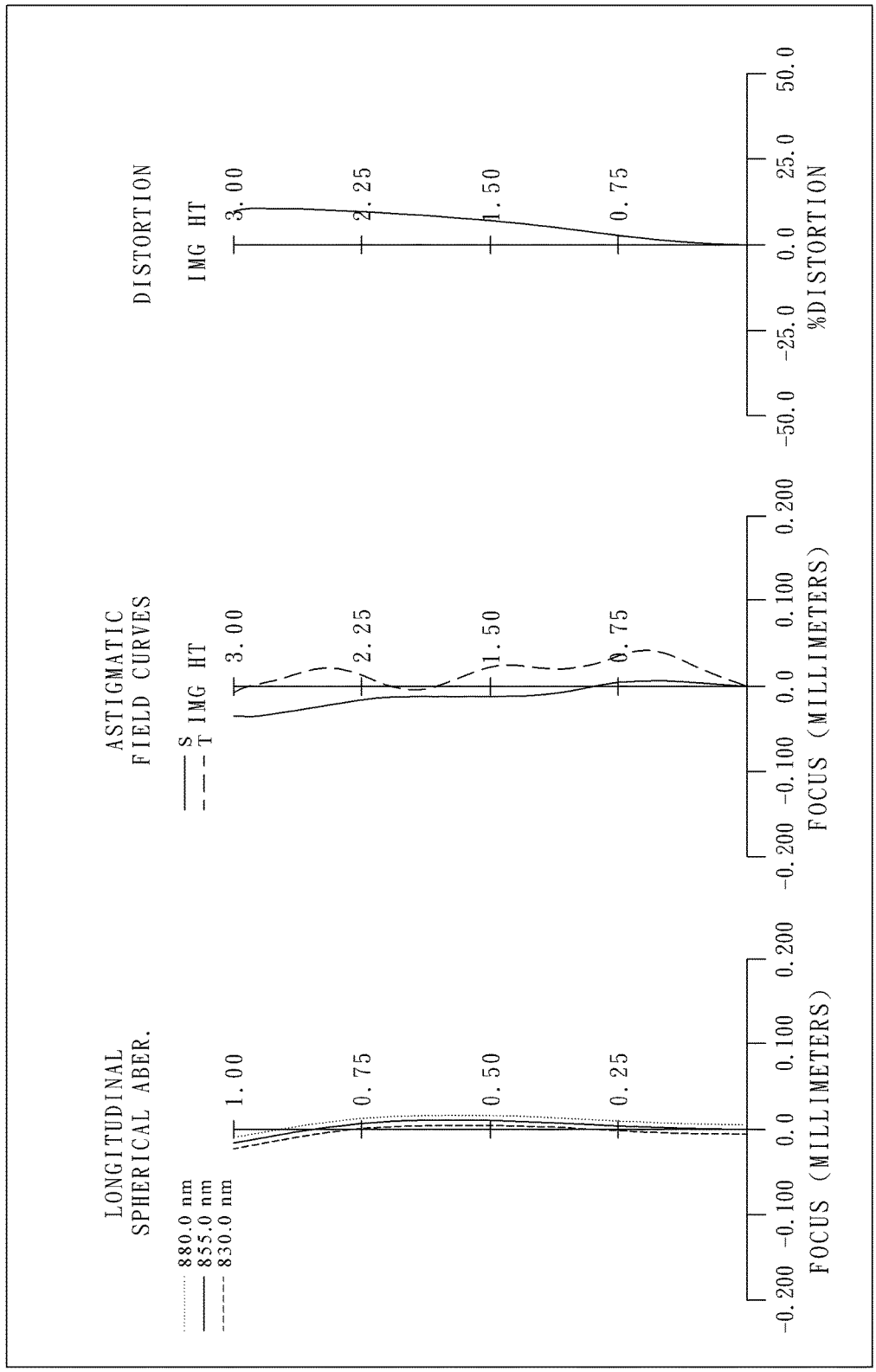
FIG. 10B shows longitudinal spherical aberration curves, astigmatic field curves and a distortion curve of the image capturing apparatus according to the 10th embodiment.
Figure 11A:
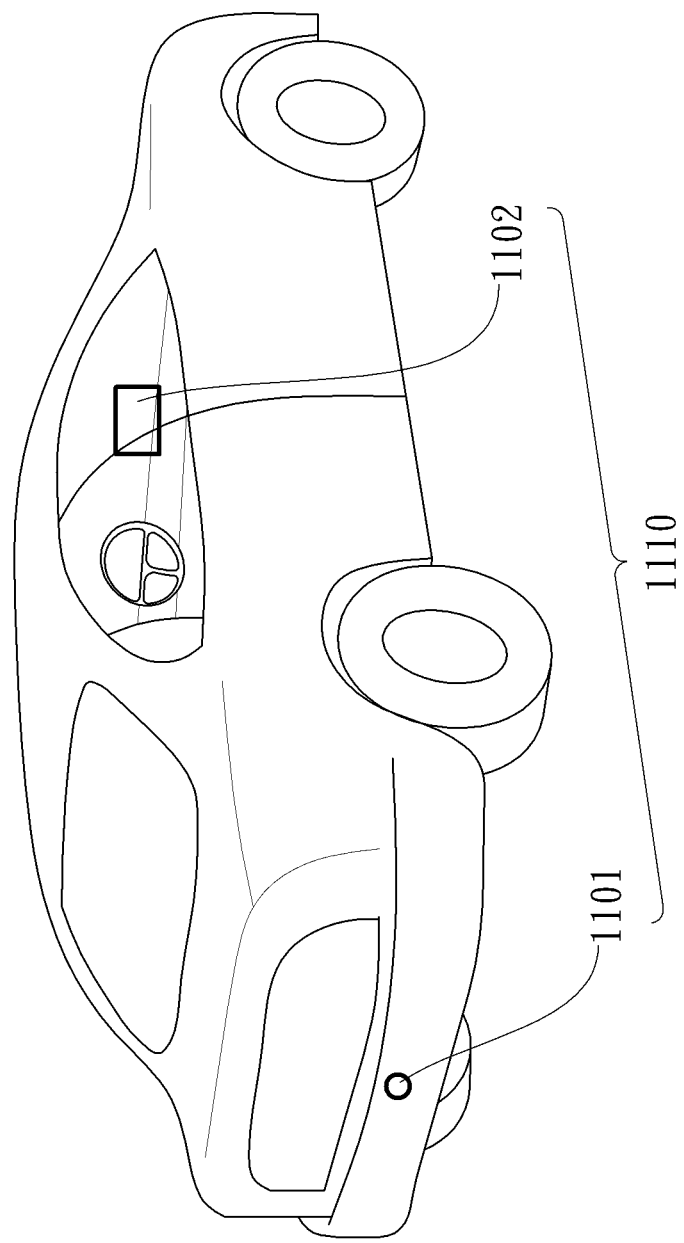
FIG. 11A shows a rear view camera with an image capturing apparatus of the present disclosure installed therein.
Figure 11B:
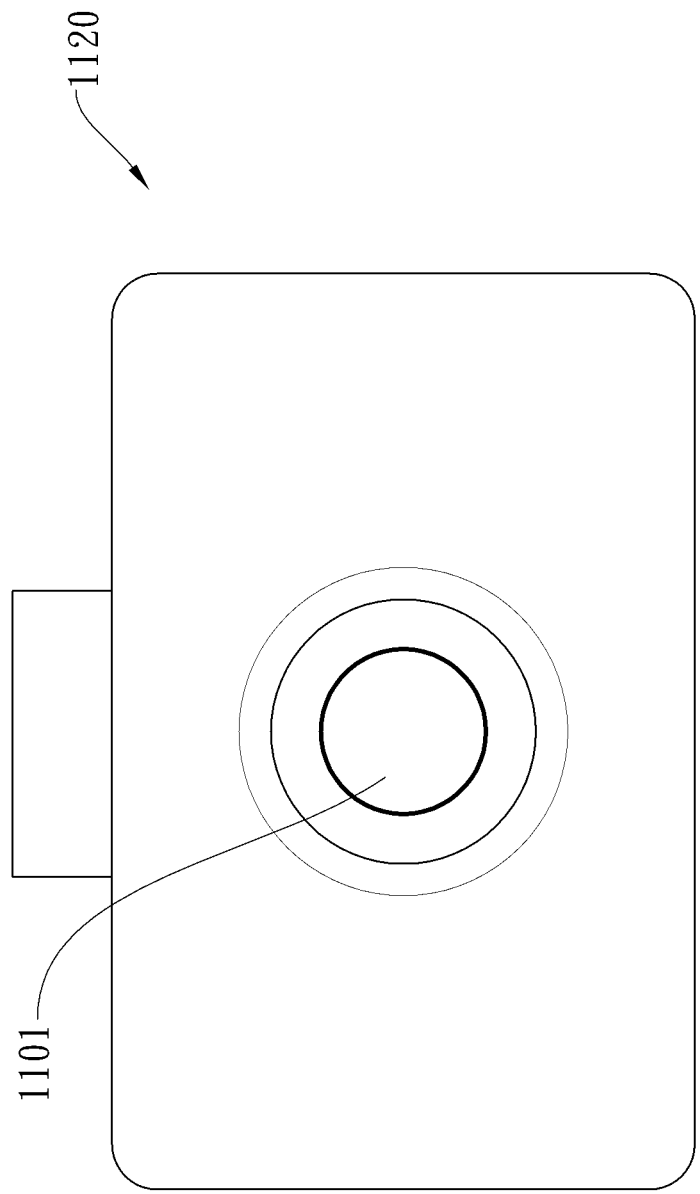
FIG. 11B shows a driving recording system with an image capturing apparatus of the present disclosure installed therein.
Figure 11C:
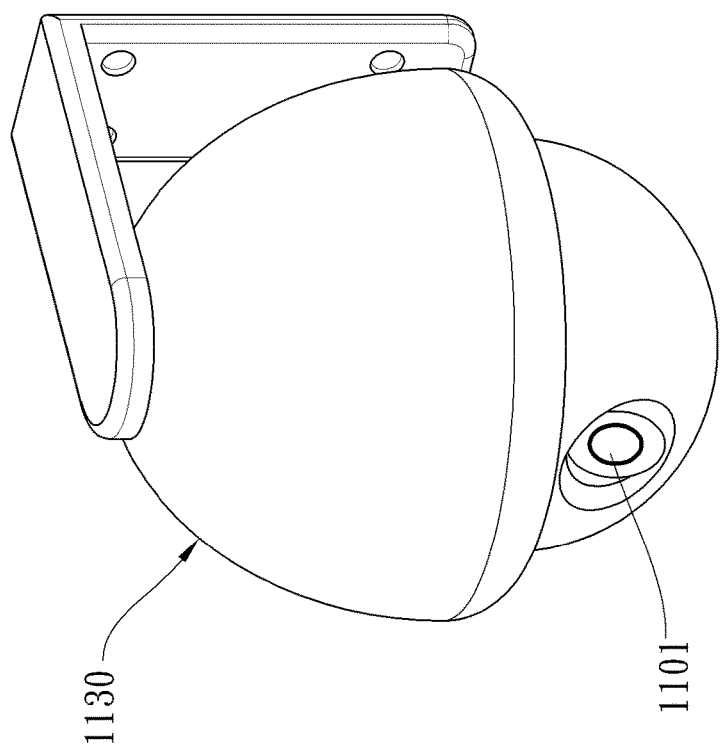
FIG. 11C shows a surveillance camera with an image capturing apparatus of the present disclosure installed therein.
Figure 11D:
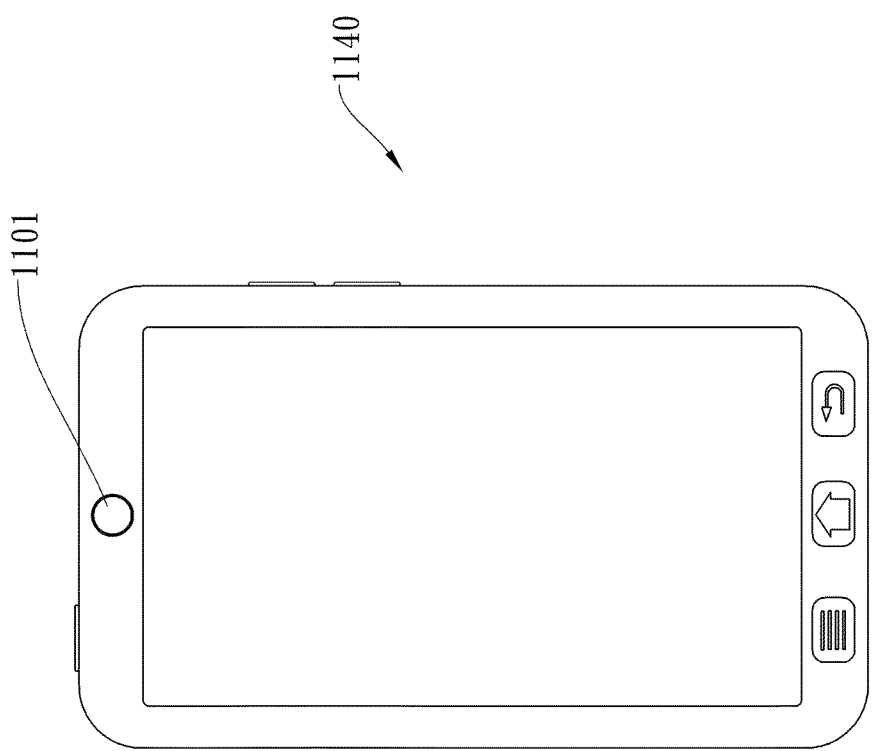
FIG. 11D shows a smart phone with an image capturing apparatus of the present disclosure installed therein.

FIG. 10A is a schematic view of an image capturing apparatus according to the 10th embodiment of the present disclosure. FIG. 10B shows, in order from left to right, longitudinal spherical aberration curves, astigmatic field curves and a distortion curve of the image capturing apparatus according to the 10th embodiment.

In FIG. 10A, the image capturing apparatus includes an optical lens assembly (not otherwise herein labeled) of the present disclosure and an image sensor 1070. The optical lens assembly comprises, in order from an object side to an image side, a first lens element 1010, an aperture stop 1000, a second lens element 1020, a third lens element 1030, and a fourth lens element 1040.

The first lens element 1010 with negative refractive power has an object-side surface 1011 being convex in a paraxial region thereof and an image-side surface 1012 being concave in a paraxial region thereof, which are both aspheric, and the first lens element 1010 is made of plastic material.

The second lens element 1020 with positive refractive power has an object-side surface 1021 being convex in a paraxial region thereof and an image-side surface 1022 being convex in a paraxial region thereof, which are both aspheric, and the second lens element 1020 is made of plastic material.

The third lens element 1030 with positive refractive power has an object-side surface 1031 being concave in a paraxial region thereof and an image-side surface 1032 being convex in a paraxial region thereof, which are both aspheric, and the third lens element 1030 is made of plastic material.

The fourth lens element 1040 with negative refractive power has an object-side surface 1041 being convex in a paraxial region thereof and an image-side surface 1042 being concave in a paraxial region thereof, which are both aspheric, and the fourth lens element 1040 is made of plastic material. Furthermore, the image-side surface 1042 of the fourth lens element 1040 has at least one convex shape in an off-axis region thereof.

The optical lens assembly further comprises a filter 1050 located between the fourth lens element 1040 and an image surface 1060. The filter 1050 is made of glass material and will not affect the focal length of the optical lens assembly. The image sensor 1070 is disposed on or near the image surface 1060 of the optical lens assembly.

The detailed optical data of the 10th embodiment are shown in TABLE 27, and the aspheric surface data are shown in TABLE 28, wherein the units of the curvature radius, the thickness and the focal length are expressed in mm, and HFOV is half of the maximum field of view.

TABLE 27

(10th Embodiment)
f = 2.25 mm, Fno = 2.40, HFOV = 50.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 117.938 | ASP | 0.392 | Plastic | 1.527 | 55.8 | −5.29 |
| 2 | | 2.721 | ASP | 1.624 | | | | |
| 3 | Ape. Stop | Plano | | −0.003 | | | | |
| 4 | Lens 2 | 3.391 | ASP | 1.225 | Plastic | 1.505 | 56.5 | 3.03 |
| 5 | | −2.445 | ASP | 0.856 | | | | |
| 6 | Lens 3 | −10.649 | ASP | 0.480 | Plastic | 1.615 | 23.8 | 4.47 |
| 7 | | −2.221 | ASP | 0.220 | | | | |
| 8 | Lens 4 | 7.068 | ASP | 1.097 | Plastic | 1.506 | 56.8 | −7.12 |
| 9 | | 2.264 | ASP | 0.515 | | | | |
| 10 | Filter | Plano | | 0.300 | Glass | 1.510 | 64.2 | — |
| 11 | | Plano | | 0.394 | | | | |
| 12 | Image Surface | Plano | | — | | | | |

Note:
Reference wavelength is 855.0 nm

TABLE 28

Aspheric Coefficients

| Surface # | | | | |
|---|---|---|---|---|
| | 1 | 2 | 4 | 5 |
| k = | 1.4719E+01 | 1.6823E+00 | −3.5472E+01 | 3.2351E+00 |
| A4 = | 1.7756E−01 | 2.1601E−01 | 6.0349E−02 | −3.2483E−02 |
| A6 = | −9.0967E−02 | −6.9488E−03 | −1.8314E−01 | −2.8406E−02 |
| A8 = | 3.8695E−02 | −1.1623E−01 | 1.9438E−01 | 2.2333E−02 |
| A10 = | −9.8844E−03 | 1.4642E−01 | −2.7265E−01 | −9.8615E−03 |
| A12 = | 1.3315E−03 | −6.5573E−02 | 1.9815E−01 | −5.3919E−03 |
| A14 = | −8.1206E−05 | 8.4900E−03 | −1.3931E−01 | 5.7745E−03 |

| Surface # | | | | |
|---|---|---|---|---|
| | 6 | 7 | 8 | 9 |
| k = | 6.3147E+01 | −4.3056E+00 | 4.1214E+00 | −4.1105E−01 |
| A4 = | 5.9397E−03 | 8.1578E−02 | 2.6413E−02 | −5.1606E−02 |
| A6 = | 4.1196E−02 | −7.3618E−02 | −8.0200E−02 | −4.1945E−02 |
| A8 = | −1.5273E−01 | 5.4701E−02 | 4.2749E−02 | 3.4225E−03 |
| A10 = | 1.4339E−01 | −5.2575E−02 | −1.0387E−02 | −7.2463E−04 |
| A12 = | −8.5927E−02 | 2.4956E−02 | 1.2094E−03 | 7.3058E−05 |
| A14 = | 2.2668E−02 | −3.8306E−03 | −5.4390E−05 | −3.2646E−06 |

In the 10th embodiment, the equation of the aspheric surface profiles of the aforementioned lens elements is the same as the equation of the 1st embodiment. Also, the definitions of these parameters shown in TABLE 29 below are the same as those stated in the 1st embodiment with corresponding values for the 10th embodiment, so an explanation in this regard will not be provided again.

Moreover, these parameters can be calculated from TABLE 27 and TABLE 28 and satisfy the conditions stated in TABLE 29.

TABLE 29

10th Embodiment

| f [mm] | 2.25 | CTmax/CTmin | 3.13 |
|---|---|---|---|
| Fno. | 2.40 | ATmax/ATmin | 7.37 |
| HFOV [deg.] | 50.4 | f/T12 | 1.39 |
| tan(HFOV) | 1.21 | R8/f | 1.01 |
| λ [nm] | 855.0 | (R1 + R2)/(R1 − R2) | 1.05 |
| T23/T12 | 0.53 | (R3 + R4)/(R3 − R4) | 0.16 |
| T12/CT2 | 1.32 | |f1/f2| | 1.75 |
| CT2/CT4 | 1.12 | |P3| + |P4| | 0.82 |

TABLE 29-continued

10th Embodiment

| (CT3 + CT4)/CT2 | 1.29 | (|P3| + |P4|)/(|P1| + |P2|) | 0.70 |
|---|---|---|---|
| ΣCT/CT2 | 2.61 | SL/TL | 0.72 |

The foregoing description, for purpose of explanation, has been described with reference to specific embodiments. It is to be noted that TABLES 1-29 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens assembly, comprising, in order from an object side to an image side:

a first lens element with negative refractive power and having an object-side surface being concave in a paraxial region thereof;

a second lens element with positive refractive power;

a third lens element with positive refractive power; and a fourth lens element with negative refractive power having an object-side surface being convex in a paraxial region thereof and an image-side surface being concave in a paraxial region thereof, the image-side surface thereof having at least one convex shape in an off-axis region thereof;

wherein an axial distance between the first lens element and the second lens element is T12, an axial distance between the second lens element and the third lens element is T23, a focal length of the optical lens assembly is f, a curvature radius of the image-side surface of the fourth lens element is R8, and the following conditions are satisfied:

T23/T12<1.50; and

0<R8/f<1.20;

wherein half of a maximum field of view of the optical lens assembly is HFOV, and the following condition is satisfied:

1.25<tan(HFOV)<13.0.

2. The optical lens assembly of claim 1, wherein the third lens element has an object-side surface being concave in a paraxial region thereof and an image-side surface being convex in a paraxial region thereof.

3. The optical lens assembly of claim 2, wherein a focal length of the first lens element is f1, a focal length of the second lens element is f2, and the following condition is satisfied:

1.0<|f1/f2|<4.0.

4. The optical lens assembly of claim 2, wherein the axial distance between the first lens element and the second lens element is the greatest among respective axial distances between every two adjacent lens elements of the optical lens assembly.

5. The optical lens assembly of claim 1, wherein the second lens element has an image-side surface being convex in a paraxial region thereof.

6. The optical lens assembly of claim 1, wherein the first through fourth lens element are made of plastic, the axial distance between the first lens element and the second lens element is T12, the axial distance between the second lens element and the third lens element is T23, and the following condition is satisfied:

T23/T12<1.0.

7. The optical lens assembly of claim 1, wherein the axial distance between the first lens element and the second lens element is T12, a central thickness of the second lens element is CT2, and the following condition is satisfied:

0.60<T12/CT2<1.85.

8. The optical lens assembly of claim 1, wherein a maximum axial distance among the axial distances between respective two adjacent lens elements of the optical lens assembly is ATmax, a minimum axial distance among the axial distances between respective two adjacent lens elements of the optical lens assembly is ATmin, and the following condition is satisfied:

1.0<ATmax/ATmin≤10.28.

9. The optical lens assembly of claim 1, wherein the focal length of the optical lens assembly is f, the axial distance between the first lens element and the second lens element is T12, and the following condition is satisfied:

0<f/T12<2.0.

10. The optical lens assembly of claim 1, wherein the object-side surface of the first lens element has at least one convex shape in an off-axis region thereof.

11. The optical lens assembly of claim 1, further comprising an aperture stop disposed between the first lens element and the second lens element.

12. An image capturing apparatus comprising the optical lens assembly of claim 1 and an image sensor.

13. An electronic device comprising the image capturing apparatus of claim 12.

14. An optical lens assembly, comprising, in order from an object side to an image side:

a first lens element with negative refractive power and having an object-side surface being concave in a paraxial region thereof;
a second lens element with positive refractive power;
a third lens element with positive refractive power; and
a fourth lens element with either positive refractive power or negative refractive power and having an object-side surface being convex in a paraxial region thereof and an image-side surface being concave in a paraxial region thereof, the image-side surface thereof having at least one convex shape in an off-axis region thereof;
wherein a focal length of the first lens element is f1, a focal length of the second lens element is f2, a focal length of the optical lens assembly is f, a curvature radius of the image-side surface of the fourth lens element is R8, and the following conditions are satisfied:

1.0<|f1/f2|<4.0; and

0<R8/f<4.0;

wherein half of a maximum field of view of the optical lens assembly is HFOV, and the following condition is satisfied:

1.25<tan(HFOV)<13.0.

15. The optical lens assembly of claim 14, wherein the fourth lens element has negative refractive power, and both of an object-side surface and an image-side surface of each of the first through fourth lens element are aspheric.

16. The optical lens assembly of claim 14, wherein the second lens element has an image-side surface being convex in a paraxial region thereof.

17. The optical lens assembly of claim 14, wherein the third lens element has an object-side surface being concave in a paraxial region thereof and an image-side surface being convex in a paraxial region.

18. The optical lens assembly of claim 14, wherein every two adjacent lens elements among the first through fourth lens elements are not cemented.

19. The optical lens assembly of claim 14, wherein the focal length of the first lens element is f1, the focal length of the second lens element is f2, and the following condition is satisfied:

1.6<|f1/f2|<3.5.

20. The optical lens assembly of claim 14, further comprising an aperture stop disposed between the first lens element and the second lens element.

21. The optical lens assembly of claim 14, wherein an axial distance between the first lens element and the second lens element is the greatest among respective axial distances between every two adjacent lens elements of the optical lens assembly.

22. An image capturing apparatus comprising the optical lens assembly of claim 14 and an image sensor.

23. An electronic device comprising the image capturing apparatus of claim 22.

24. An optical lens assembly, comprising, in order from an object side to an image side:

a first lens element with negative refractive power and having an object-side surface being concave in a paraxial region thereof;
a second lens element with positive refractive power and having an image-side surface being convex in a paraxial region thereof;
a third lens element with positive refractive power;

a fourth lens element with either positive refractive power or negative refractive power and having an object-side surface being convex in a paraxial region thereof and an image-side surface being concave in a paraxial region thereof, the image-side surface thereof having at least one convex shape in an off-axis region thereof; and an aperture stop disposed between the first lens element and the second lens element;

wherein half of a maximum field of view of the optical lens assembly is HFOV, and the following condition is satisfied:

$1.25 < \tan(HFOV) < 13.0$.

25. The optical lens assembly of claim 24, wherein the third lens element has an object-side surface being concave in a paraxial region thereof and an image-side surface being convex in a paraxial region thereof.

26. The optical lens assembly of claim 24, wherein half of the maximum field of view of the optical lens assembly is HFOV, and the following condition is satisfied:

$1.73 \leq \tan(HFOV) < 13.0$.

* * * * *